(12) United States Patent
Fayneh et al.

(10) Patent No.: US 11,327,523 B2
(45) Date of Patent: May 10, 2022

(54) METHOD AND APPARATUS TO UTILIZE A DIGITAL-TIME-CONVERSION (DTC) BASED CLOCKING IN COMPUTING SYSTEMS

(71) Applicant: Intel Corporation, Santa Clara, CA (US)

(72) Inventors: Eyal Fayneh, Givatyim (IL); Elias Nassar, Haifa (IL); Inbar Falkov, Tel Aviv (IL); Ramkumar Krithivasan, El Dorado Hills, CA (US); Vijay K. Vuppaladadium, Folsom, CA (US); Miguel A. Corvacho Hernandez, El Dorado Hills, CA (US); Samer Nassar, Nazareth (IL); Yair Talker, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 16/799,480

(22) Filed: Feb. 24, 2020

(65) Prior Publication Data

US 2020/0301465 A1    Sep. 24, 2020

Related U.S. Application Data

(63) Continuation of application No. 15/642,109, filed on Jul. 5, 2017, now Pat. No. 10,571,953.

(51) Int. Cl.
| | |
|---|---|
| *G06F 1/06* | (2006.01) |
| *G06F 1/08* | (2006.01) |
| *G06F 1/04* | (2006.01) |
| *G06F 1/12* | (2006.01) |

(52) U.S. Cl.
CPC ............ *G06F 1/06* (2013.01); *G06F 1/08* (2013.01); *G06F 1/04* (2013.01); *G06F 1/12* (2013.01)

(58) Field of Classification Search
CPC ..... G06F 1/08; G06F 1/04; G06F 1/12; G06F 1/06
USPC ........................... 713/500, 501, 600
See application file for complete search history.

(56) References Cited

U.S. PATENT DOCUMENTS

| | | | | |
|---|---|---|---|---|
| 6,240,123 | B1 * | 5/2001 | Zhang | H04B 15/04 375/130 |
| 6,697,416 | B1 * | 2/2004 | Jennings | G06F 1/04 327/291 |
| 7,542,749 | B1 | 6/2009 | Liu et al. | |
| 7,545,848 | B2 | 6/2009 | Haeffele | |
| 8,044,745 | B2 * | 10/2011 | Ma | H04B 15/04 332/117 |
| 8,768,278 | B2 | 7/2014 | Frank | |

(Continued)

OTHER PUBLICATIONS

International Preliminary Report on Patentability from PCT/US2018/036135 dated Jan. 16, 2020, 11 pgs.

(Continued)

*Primary Examiner* — Ji H Bae
(74) *Attorney, Agent, or Firm* — Schwabe, Williamson & Wyatt, P.C.

(57) ABSTRACT

A system is provided which comprises: a first circuitry to generate a first clock signal; and a second circuitry to generate a second clock signal such that: a frequency of the second clock signal is varied over a clock pulse of the first clock signal, and an average of the frequency of the second clock signal over the clock pulse of the first clock signal is substantially maintained at a target frequency.

17 Claims, 21 Drawing Sheets

(56) References Cited

U.S. PATENT DOCUMENTS

| | | | |
|---|---|---|---|
| 8,975,975 B2 | 3/2015 | Schrom et al. | |
| 9,071,304 B2 | 6/2015 | Banin et al. | |
| 9,137,084 B2 | 9/2015 | Degani et al. | |
| 9,577,684 B1 | 2/2017 | Zur et al. | |
| 9,819,479 B2 | 11/2017 | Degani et al. | |
| 9,941,898 B1 | 4/2018 | Banin et al. | |
| 2003/0197537 A1* | 10/2003 | Saint-Laurent | H03K 5/133 327/165 |
| 2006/0083289 A1 | 4/2006 | Carley et al. | |
| 2009/0055676 A1* | 2/2009 | Wiebe | G06F 1/06 713/501 |
| 2009/0164827 A1 | 6/2009 | Komninakis et al. | |
| 2010/0150271 A1 | 6/2010 | Brown et al. | |
| 2012/0109259 A1 | 5/2012 | Bond et al. | |
| 2012/0144224 A1 | 6/2012 | Machnicki et al. | |
| 2013/0235906 A1 | 9/2013 | Kim et al. | |
| 2014/0254734 A1* | 9/2014 | Abdelmoneum | H03L 7/0995 375/376 |
| 2015/0052379 A1 | 2/2015 | Shirai | |
| 2016/0182262 A1* | 6/2016 | Leistner | H04B 15/06 370/338 |
| 2017/0085365 A1 | 3/2017 | Ravi et al. | |
| 2017/0093556 A1 | 3/2017 | Degani et al. | |
| 2018/0284835 A1* | 10/2018 | Bal | G06F 13/4291 |

OTHER PUBLICATIONS

International Search Report and Written Opinion from PCT/US2018/036135 dated Sep. 28, 2018, 14 pgs.
Non-Final Office Action from U.S. Appl. No. 15/642,109 dated May 1, 2019, 9 pgs.
Notice of Allowance from U.S. Appl. No. 15/642,109 dated Oct. 10, 2019, 5 pgs.

* cited by examiner

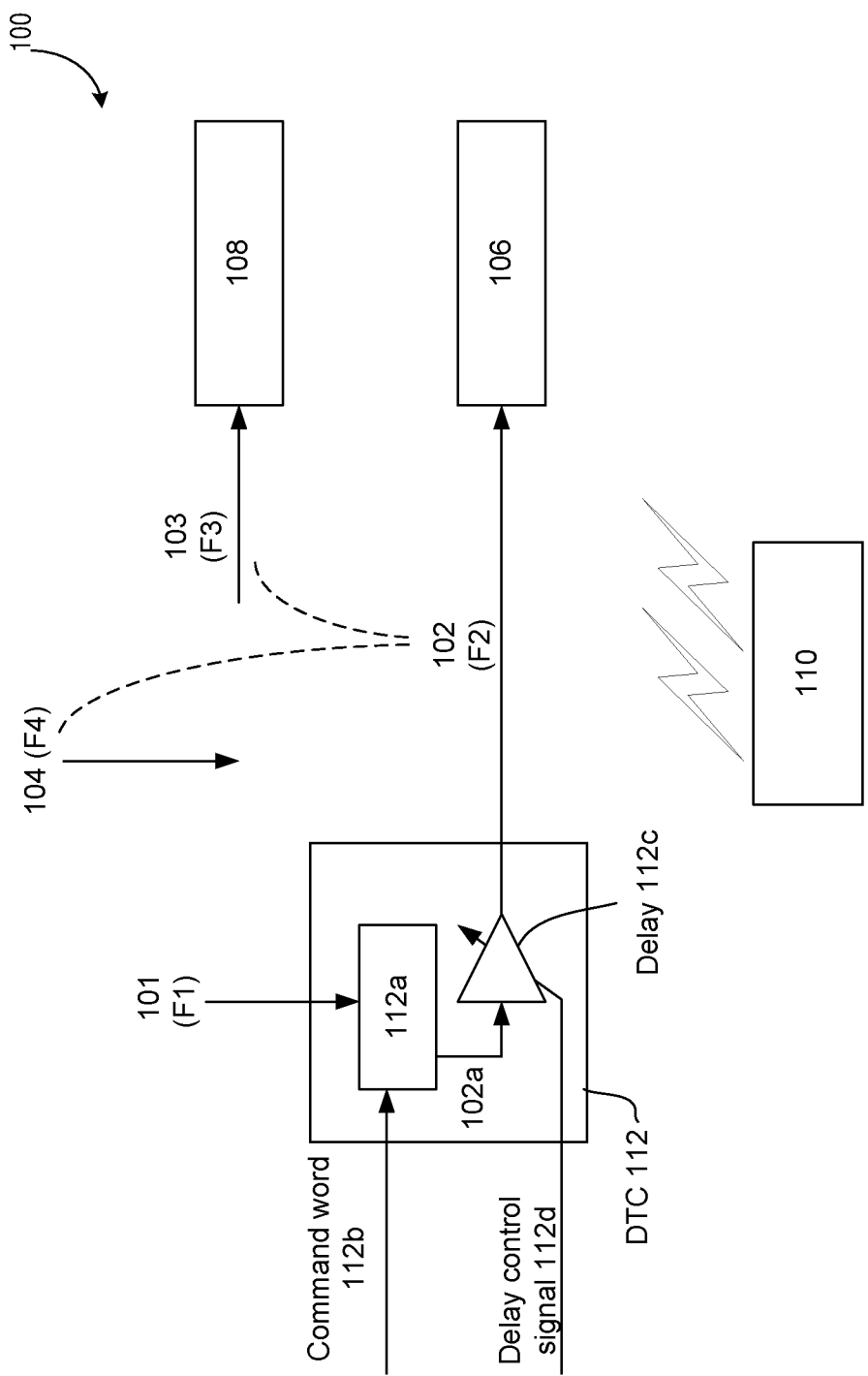

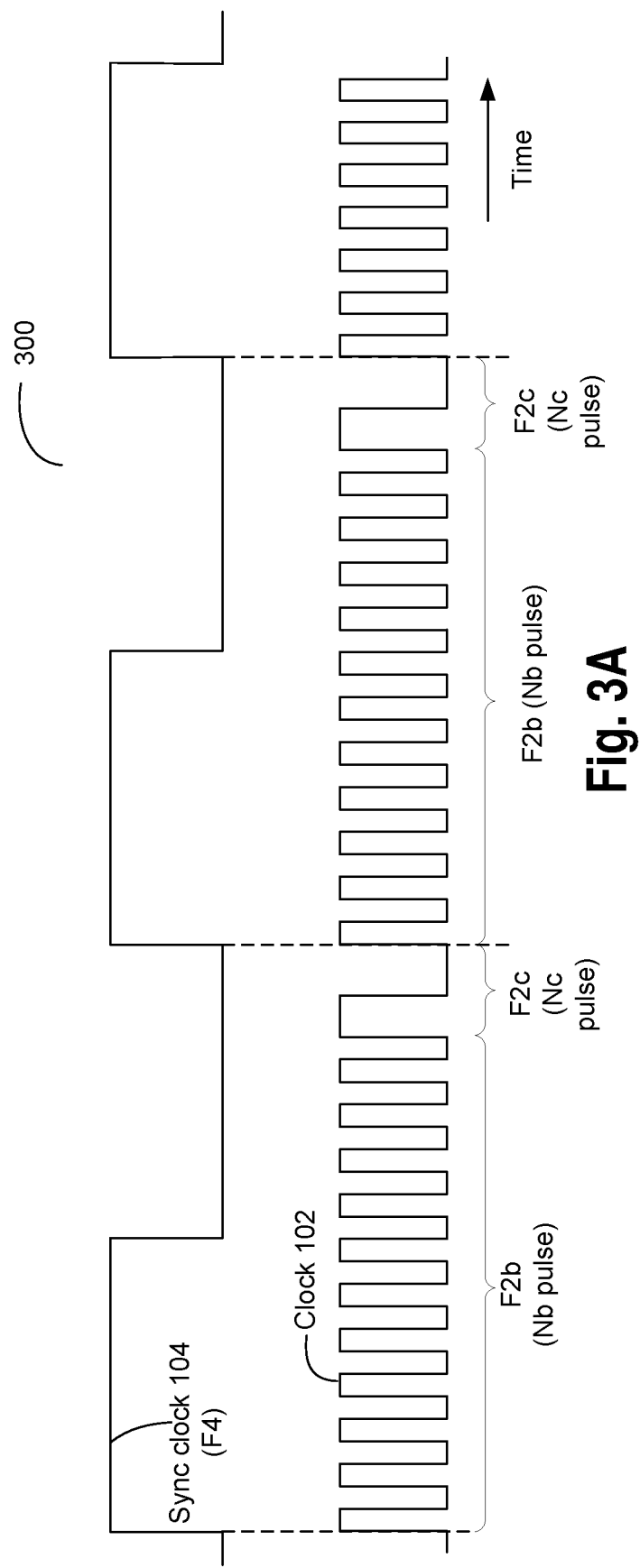

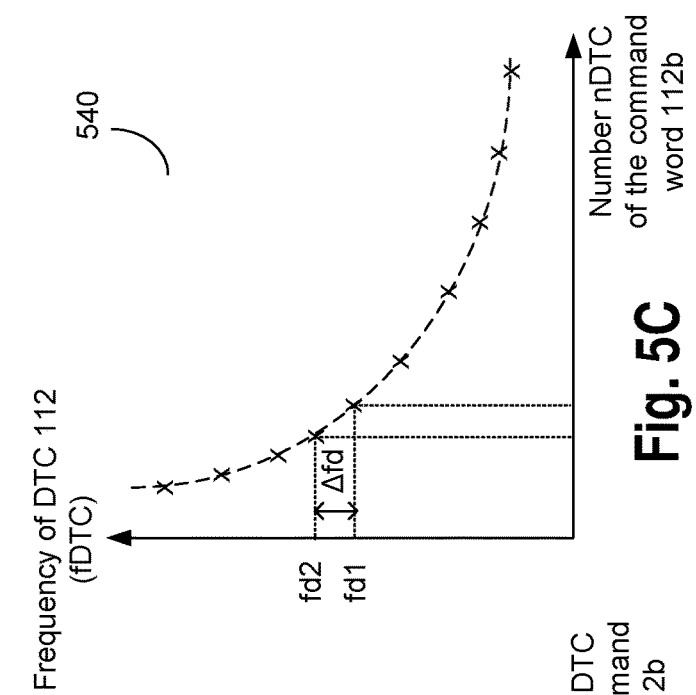
Fig. 5C
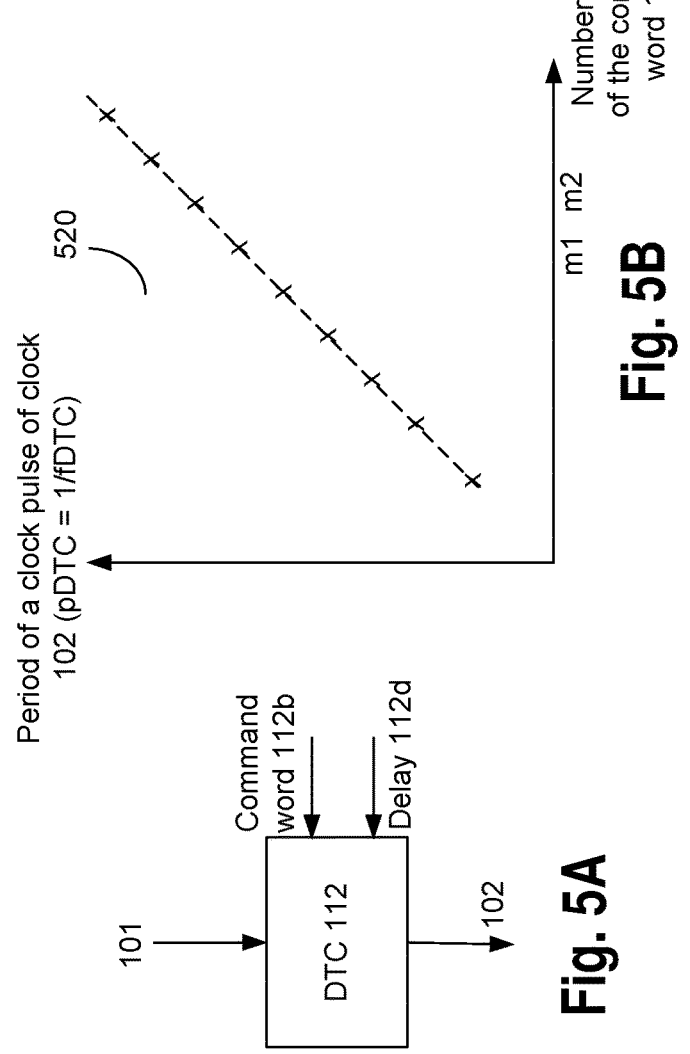
Fig. 5B
Fig. 5A

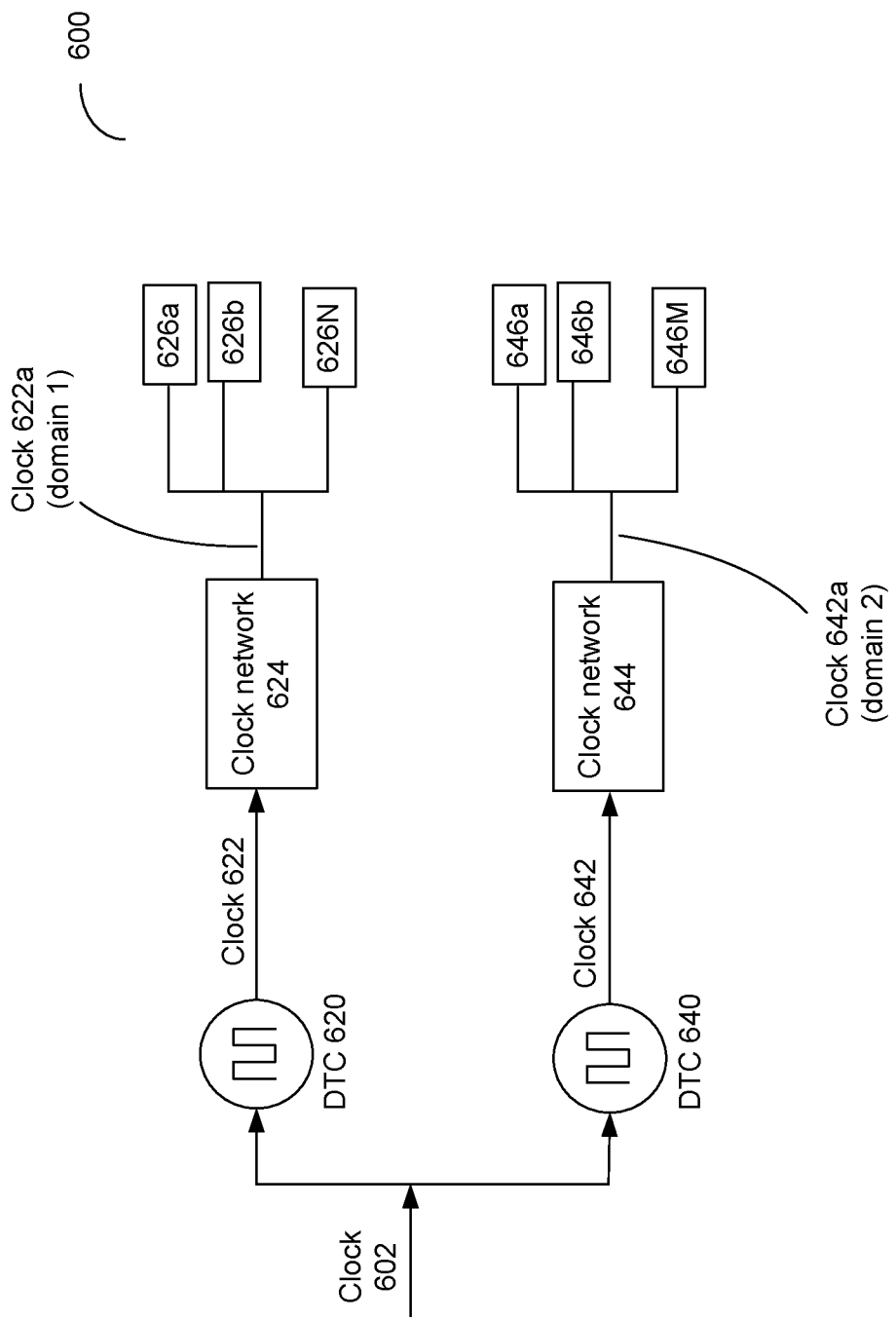

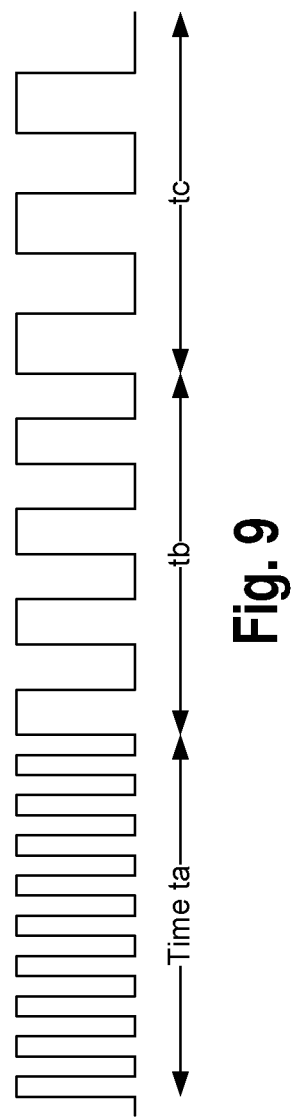

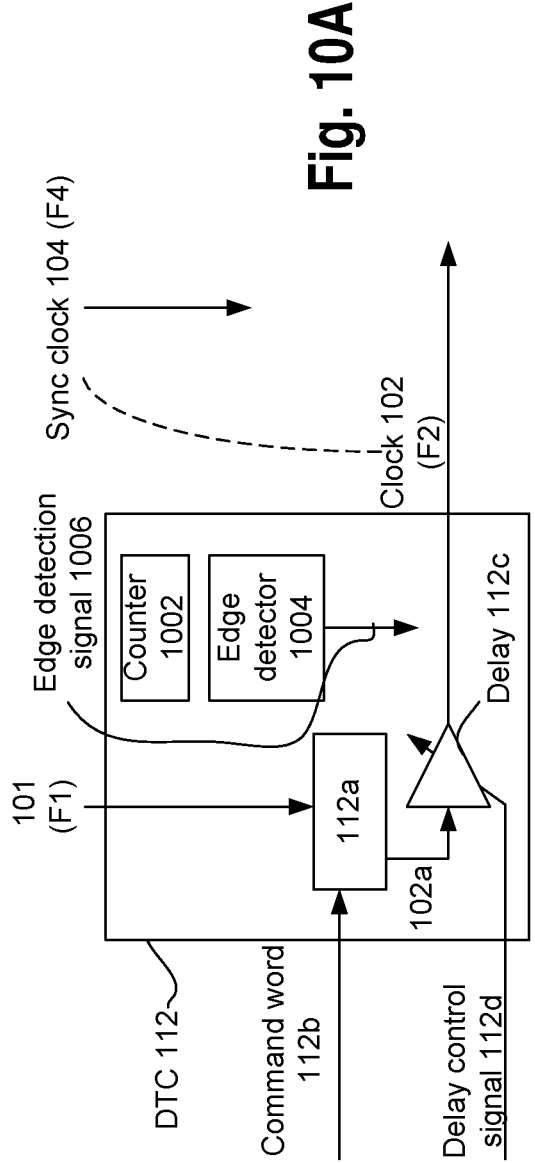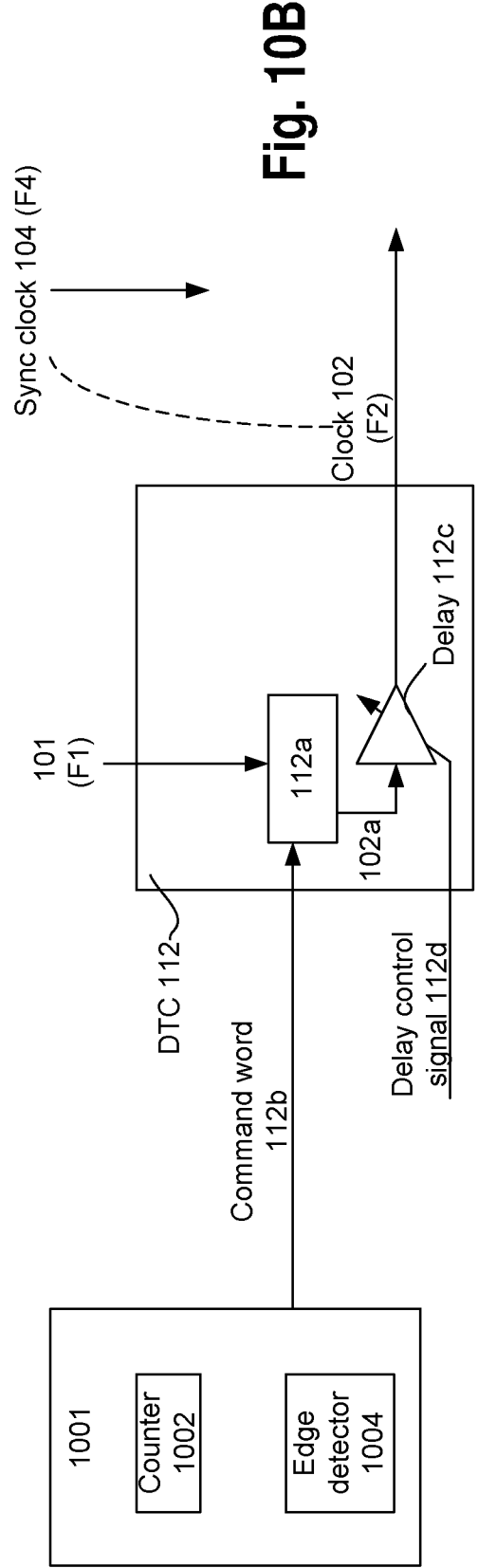

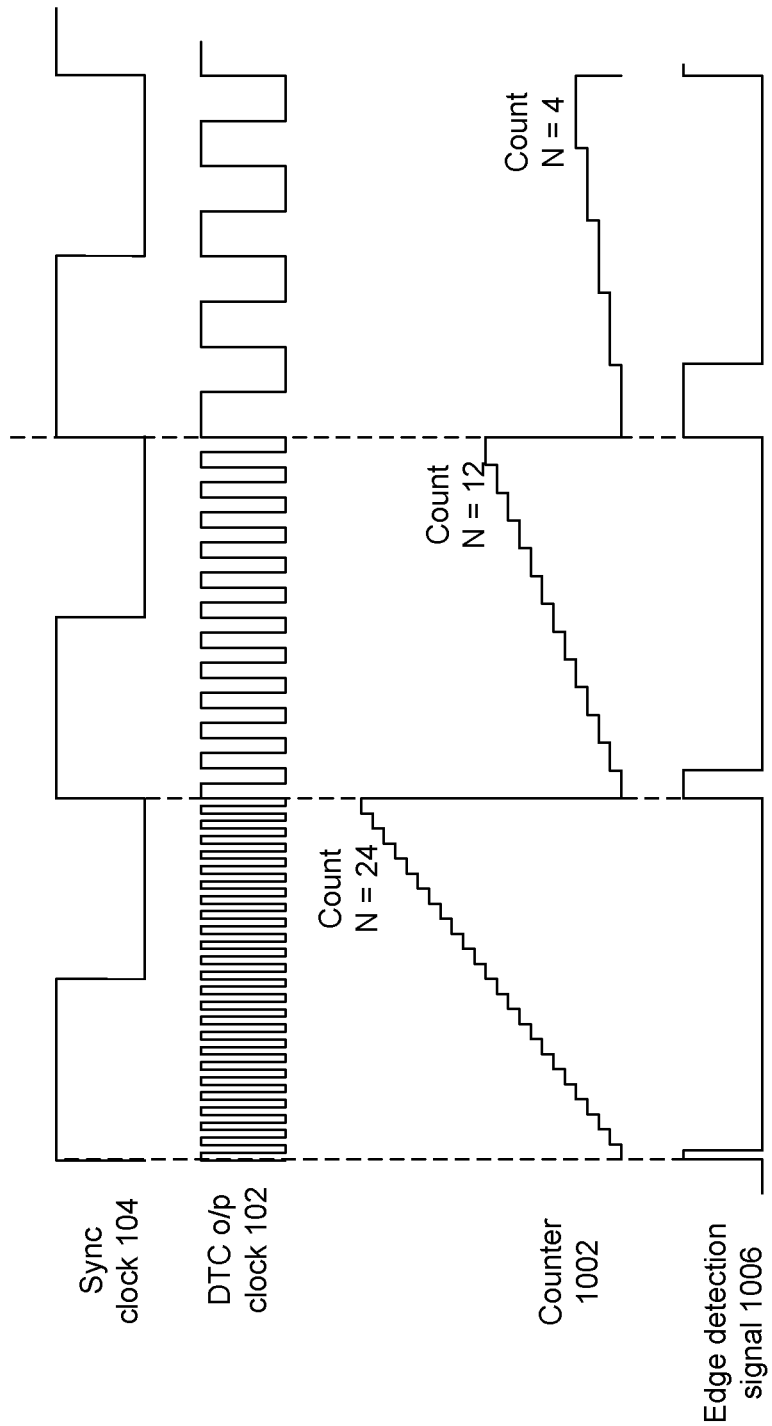

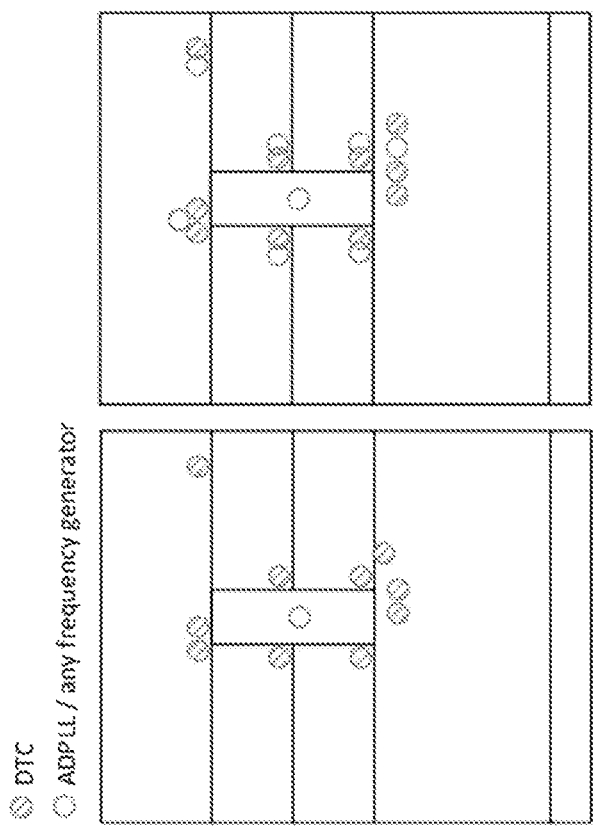

METHOD AND APPARATUS TO UTILIZE A DIGITAL-TIME-CONVERSION (DTC) BASED CLOCKING IN COMPUTING SYSTEMS

CLAIM OF PRIORITY

This application is a continuation of, and claims priority to, U.S. patent application Ser. No. 15/642,109, filed on Jul. 5, 2017 and titled "METHOD AND APPARATUS TO UTILIZE A DIGITAL-TIME-CONVERSION (DTC) BASED CLOCKING IN COMPUTING SYSTEMS", which is incorporated by reference in its entirety.

BACKGROUND

Many electronic devices perform their operations using timing of one or more clock signals generated by one or more clock generators included in the devices. Phase locked loop (PLL) clock generators are widely used to generate clock signals. A conventional PLL clock generator traditionally may have a long frequency transition time, e.g., when the PLL clock generator switches from one frequency to another. During such a frequency transition, the frequency behavior of the clock signal generated by the PLL clock generator may be unpredictable. Thus, it may not be possible to rapidly change frequency of a clock signal generated by the PLL clock generator.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 1 schematically illustrates a computing system comprising a digital-time-conversion (DTC) circuitry that may be used for adaptive clock technology, according to some embodiments.

FIG. 3A illustrates a timing diagram of clock pulses of the sync clock and the first clock, where the frequency of the first clock is dynamically varied with time, according to some embodiments.

FIG. 5A illustrates a DTC circuitry, according to some embodiments.

FIG. 5B illustrates a graph illustrating an example relationship between a clock period of a clock output of a DTC circuitry and a number associated with a command word of the DTC circuitry, according to some embodiments.

FIG. 5C illustrates a graph illustrating an example relationship between a frequency of a clock output of a DTC circuitry and a number associated with a command word of the DTC circuitry, according to some embodiments.

FIG. 6 illustrates a system comprising two DTCs operating in open loops, according to some embodiments.

FIG. 9 illustrates a variation in a frequency of a clock output by a DTC, according to some embodiments.

FIGS. 10A and 10B illustrate an example DTC associated a counter and an edge detector, according to some embodiment.

FIG. 11 illustrates a timing diagram of an output clock of a DTC, where a frequency change in the output clock is aligned with rising edges of a sync clock, according to some embodiments.

FIGS. 16A-16B illustrate various example placements of All-Digital Phase Locked Loop (ADPLL) with respect to a plurality of DTCs, where one or more ADPLL may selectively generate a moderate frequency clock or a high frequency clock, according to some embodiments.

DETAILED DESCRIPTION

Figure 2A:
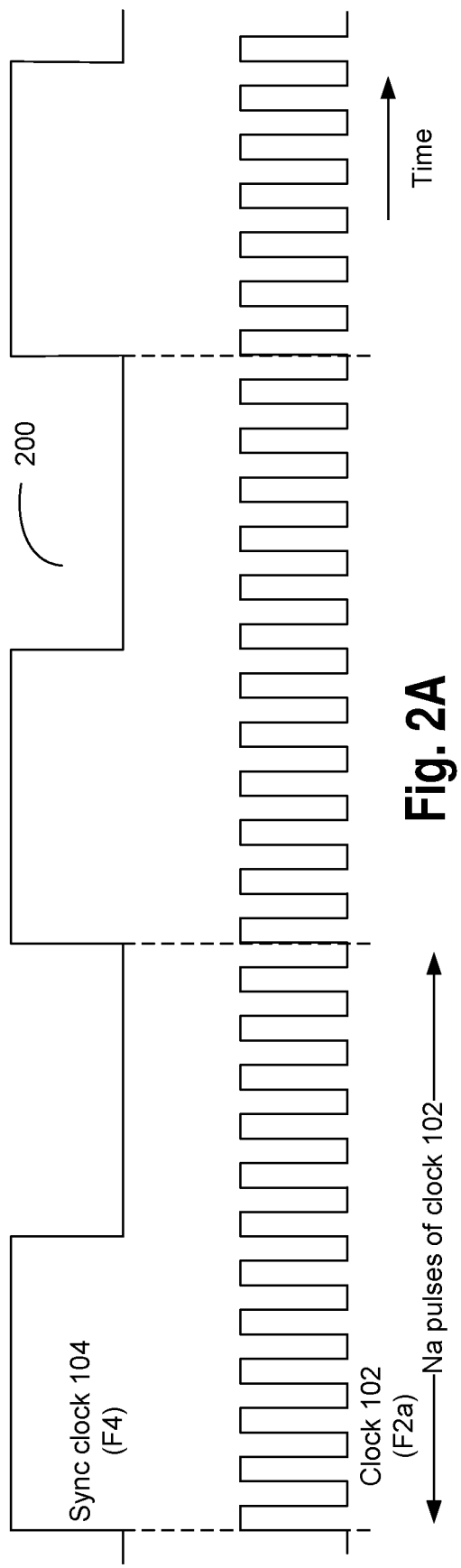
FIG. 2A illustrates a timing diagram of clock pulses of a sync clock and a first clock, where a frequency of the first clock is not dynamically varied with time, according to some embodiments.

A digital to time conversion (DTC) circuitry may be used to generate the clock signal for one or more domains or IP block of a computing device. In some embodiments, the clock signal of each of the domains may have to be synchronized to a synchronization clock signal to assure determinism between the different domains. For example, for ensuring determinism between various clock domains, a rising edge of a certain domain clock signal may have to be aligned to a rising edge of the synchronization clock signal. Assume, for example, for such alignment, the domain clock signal has to be generated at a target frequency.

In some embodiments, the clock frequency of one of the domains or it's harmonics may be substantially similar or in the same range of a frequency of wireless signals transmitted or received by the computing device. In such an example, the domain clock signal can generate interference and noise in the wireless system.

In some embodiments, in order to mitigate such interference, a frequency of the domain clock signal may be varied to shift its frequency out of the wireless system frequency band. To maintain synchronization between various clock domains, an average of the frequency of the domain-clock signal over each clock pulse of the synchronization clock signal may still be maintained at the target frequency. In some embodiments, varying the frequency in such a manner will reduce or abolish any potential interference with the wireless signals transmitted at the target frequency, and yet, maintain synchronization between various clock domains.

In some embodiments, the frequency of the first clock signal has to be varied rapidly, e.g., to reduce or abolish any potential interference with the wireless signals transmitted at the target frequency, and yet, maintain synchronization between various clock domains. A conventional PLL may not be able to keep up with such a rapid variation in frequency. However, a DTC can be used to vary the frequency in such a rapid manner, as discussed herein.

In some embodiments, decreasing a frequency binning in a conventional PLL may have undesirable effects, e.g., result in reduced stability, jitter, lock-time, etc. However, in some embodiments, in a DTC, the frequency resolution can be decreased considerably, without such undesirable effects. In some embodiments, in a DTC, the frequency may be varied by a command word. For example, the command word may control a clock period of the clock output of the DTC, thereby controlling the frequency of the domain-clock signal of the DTC. Thus, in an example, the command word may linearly or about linearly change the clock period of the domain-clock signal, thereby achieve a binning in the time domain. In contrast, in a conventional PLL, a control input may linearly or about linearly change a frequency of the PLL output clock.

Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

FIG. 1 schematically illustrates a computing system 100 (henceforth referred to as a "system 100") comprising a digital to time conversion (DTC, also referred to as "digital-time-conversion") circuitry 112 (henceforth also referred to as "DTC 112") that may be used for adaptive clock technology, according to some embodiments. In some embodiments, the DTC 112 may receive a clock signal 101 (henceforth also referred to as "clock 101") having a frequency of F1. The clock 101 may be any appropriate clock signal generated, for example, by any combination of a crystal oscillator, a PLL, a delay locked loop (DLL), and other circuitry (or components) that can generate a clock signal. The frequency F1 of the clock 101 may be, merely as examples, 5 Gigahertz (GHz), 10 GHz, 2 GHz, or the like. In some embodiments, the frequency F1 of the clock 101 may not usually change (e.g., change substantially or be changed intentionally) with time, although in some other embodiments the frequency F1 may change.

In some embodiments, the DTC 112 may comprise a clock change circuitry 112a (also referred to herein as "circuitry 112a"), which may receive a command word 112b and the clock 101, and generate a clock signal 102a (henceforth also referred to as "clock 102a"). In some embodiments, the DTC 112 may also comprise a delay element 112c receiving the clock 102a. The delay element 112c may output a clock signal 102 (henceforth also referred to as "clock 102") having a frequency of F2, and the delay element 112c may be controller by a delay control signal 112d.

Thus, the DTC 112 may receive the clock 101 at frequency F1, and generate the clock 102 at the frequency F2. In some embodiments, the command word 112b may control the frequency F2 of the clock 102. For example, by dynamically selecting and/or changing the command word 112b, the frequency F2 of the clock 102 may also be selected and/or changed. In some embodiments, the command word 112b may set the period of individual clock pulses of the clock 102, thereby setting the frequency F2 of the clock 102.

For example, during a first time-period (or for at least a first number of clock pulses of the clock 102), the clock period of the clock 102 may be P1, which may translate to the frequency F2 having a value of, for example, F2p1 during the first time-period—the clock period P1 may be based on a first value of the command word 112b during the first time-period. Also, for example, during a second time-period (or for at least a second number of clock pulses of the clock 102), the clock period of the clock 102 may be P2, which may translate to the frequency F2 having a value of, for example, F2p2 during the second time-period—the clock period P2 may be based on a second value of the command word 112b during the second time-period. Thus, the frequency F2 may be varied dynamically, based on a value of the command word 112b. In some embodiments, the phase of the clock 102 may be controlled by the delay control signal 112d.

Although FIG. 1 illustrates the clock change circuitry 112a and the delay element 112c, these components are separately illustrated to explain the operation of the DTC 112. For example, in some embodiments, the clock change circuitry 112a and the delay element 112c may be combined in a single circuit, and there may not be a precise division among these two circuit elements.

A DTC circuitry in general has been discussed in further details in, for example, U.S. patent application Ser. No. 13/958,295, now patented as U.S. Pat. No. 9,137,084, which is incorporated by reference herein.

In some embodiments, the frequency F2 of the clock 102 can be an integer or a non-integer multiple of the frequency F1 of the clock 101. In some embodiments, the frequency F2 of the clock 102 can be equal to the frequency F1 of the clock 101 divided by an integer or fraction (e.g., the DTC 112 may perform an integer division or a fractional division of the clock 101 to generate the clock 102). Thus, in some embodiments, the frequency F2 of the clock 102 may be less than, equal to, or greater than the frequency F1 of the clock 101.

In some embodiments, the clock 102 may be received by one more components, generally referred to as a component 106. In some embodiments, the component 106 may represent any appropriate component(s) of the system 100, e.g., a memory, a memory controller, a peripheral device, a processor, and/or the like. The component 106 may operate based at least in part on the clock 102.

In some embodiments, the system 100 may comprises one or more other components, generally referred to as a component 108. The component 108 may be, for example, one or more processing cores, caches and/or any other appropriate component of the system 100. The component 108 may receive a clock 103 having a frequency of F3, and may operate based at least in part on the clock 103. The clock 103 may be generated by another DTC (not illustrated in FIG. 1), or may be generated by another appropriate clock generator.

In some embodiments, the system 100 may comprises one or more yet other components, generally referred to as a component 110. The component 110 may have wireless transmission and/or reception capability. For example, the component 110 may communicate with an appropriate wireless protocol. For example, the component 110 may be a wireless transmitter, a wireless receiver, a wireless communication interface, an antenna and/or the like.

In some embodiments, there may be Electro Magnetic Interference (EMI) in the system 100 caused by the clock 102. For example, the clock signal 102 may be transmitted through the vicinity of the component 110, such that the frequency F2 of the clock 102 and/or the harmonics of the frequency F2 may cause interference to the wireless communication of the component 110 (e.g., at least partially jam a radio receiver of the component 110). In some embodiments, the frequency F2 of the clock may be dynamically varied to overcome such issues, as discussed herein.

In some embodiments, the system 100 may also generate a synchronization clock signal 104 (henceforth also referred to as "sync clock 104") having a frequency of F4. The sync clock 104 may be, for example, a global alignment (GAL) signal. For example, the sync clock 104 may be a clock signal to which one or more clock signals of the system 100 may be aligned. In some embodiments, the frequency F4 may be relatively low, e.g., compared to the frequencies F1, F2, and/or F3. The sync clock 104 may be any appropriate clock signal generated, for example, by any combination of a crystal oscillator, a PLL, a delay locked loop (DLL), and other circuitry (or components) that can generate a clock signal. Merely as an example, the frequency F4 of the sync clock 104 may be 8.33 Mega-Hertz (MHz).

In some embodiments, the clocks 102 and 103 has to be at least in part synchronized, e.g., in order to ensure proper operations of the components 106 and 108 and to ensure synchronous communication between the clock domains of the clocks 102 and 103. As an example, the clock 102 may be synchronized with the sync clock 104, and the clock 103 may also be synchronized with the sync clock 104, which may result in the clocks 102 and 103 being at least in part synchronized (such synchronization is symbolically illustrated using dotted lines in FIG. 1). For example, a rising edge of the clock 102 may have to be aligned with a rising edge of the sync clock 104; and a rising edge of the clock 103 may have to be aligned with a rising edge of the sync clock 104. Additionally or alternatively, an average frequency of the clock 102, over a single pulse of the sync clock 104, may have to be equal or at least about equal to a specific target frequency for such synchronization. Such synchronization requirement of the clock 102 with respect to the clocks 103 and/or 104 may also be termed as maintaining determinism between the clock domains of the clocks 102 and 103.

However, in some other embodiments, the clock 102 need not be synchronous with the sync clock 104 and/or clock 103. For example, the system 103 may implement asynchronous communication, which may not need determinism (or synchronous operations) between the clock domains of the clocks 102 and 103.

Figure 2B:
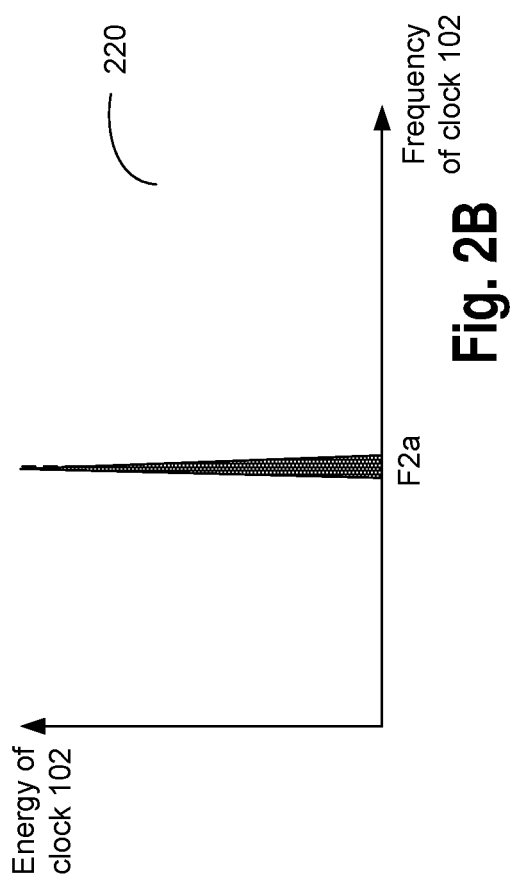
FIG. 2B illustrates a power spectral density (PSD) graph for the clock pulses of the first clock of FIG. 2A, according to some embodiments.

FIG. 2A illustrates a timing diagram 200 of clock pulses of the sync clock 104 and the clock 102 of FIG. 1, where the frequency of the clock 102 is not dynamically varied with time, according to some embodiments; and FIG. 2B illustrates a power spectral density (PSD) graph 220 for the clock pulses of the clock 102 of FIG. 2A, according to some embodiments.

Referring to FIG. 2A, the sync clock 104 may be a relatively slow clock signal (e.g., compared to the clock 102). Merely as an example, the sync clock 104 may have a frequency of 8.33 MHz (e.g., F4=8.33 MHz).

The clock 102 may have a higher frequency (e.g., in the Gigahertz range) such that, for example, the clock 102 may have several pulses within a single pulse of the sync clock 104. In some embodiments, to maintain consistency and clock synchronization between various clock domains, an average frequency of the clock 102, over a single pulse of the sync clock 104, may have to be equal or at least about equal to a specific target frequency F2a. In FIG. 2A, the frequency of the clock 102 may be maintained at the frequency F2a, and rising edges of the sync clock 104 may align with corresponding rising edges of the clock 102. Assume, for example, for the frequency to be F2a, there may be Na number of clock pulses of the clock 102 within a single clock pulse of the sync clock 104, e.g., as illustrated in FIG. 2A.

In some embodiments, to maintain determinism between various clock domains, the frequency F2a may have to be an integer multiple of the frequency of the sync clock 104 (or an integer multiple of a reference clock from which the sync clock 104 is generated).

Referring to FIG. 2B, in the PSD graph 220, the X axis represents a frequency of the clock 102, and the Y axis represents a power or energy of the clock 102. For example, the graph 220 illustrates distribution of power of the clock 102 over various frequencies. As the clock 102 is operated at the frequency F2a, the graph 220 has non-zero energy at or near this frequency (and may also have non-zero energy at harmonics of this frequency, although not illustrated in FIG. 2B).

In some embodiments, the energy of the clock 102 at the frequency F2a may generate interference for wireless signals transmitted and/or received by the component 110. For example, the component 110 may wirelessly transmit and/or receive signals at or near the frequency F2a or its harmonics, and hence, the clock 102 may contribute noise and interference to the signals communicated wirelessly by the component 110.

Figure 3B:
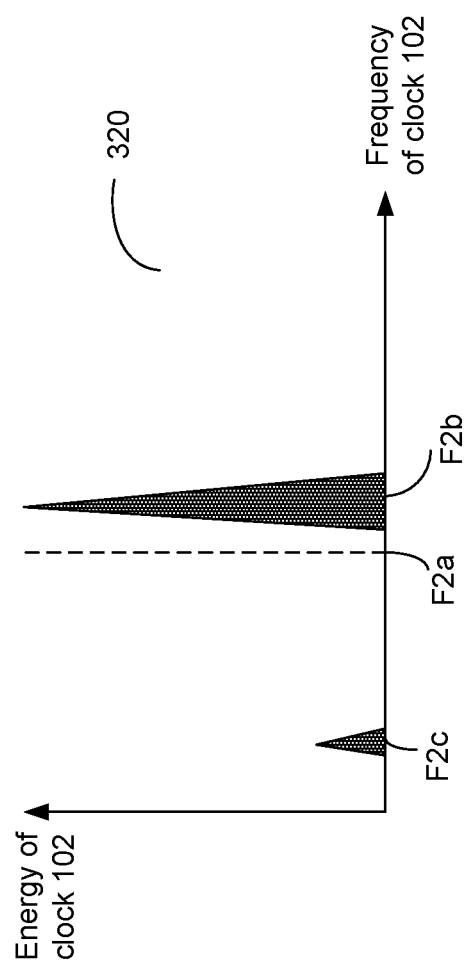
FIG. 3B illustrates a PSD graph for the clock pulses of the first clock of FIG. 3A, according to some embodiments.

FIG. 3A illustrates a timing diagram 300 of clock pulses of the sync clock 104 and the clock 102 of FIG. 1, where the frequency of the clock 102 is dynamically or adaptively varied with time, according to some embodiments; and FIG. 3B illustrates a power spectral density (PSD) graph 320 for the clock pulses of the clock 102 of FIG. 3A, according to some embodiments.

Referring to FIG. 3A, the sync clock 104 may be a relatively slow clock signal (e.g., compared to the clock 102). Merely as an example, the sync clock 104 may have a frequency of 8.33 MHz (e.g., F4=8.33 MHz). The clock 102 may have a higher frequency (e.g., in the Gigahertz range) such that, for example, the clock 102 may have several pulses within a single pulse of the sync clock 104. In some embodiments, to maintain consistency and clock synchronization between various clock domains, in FIG. 3A, an average frequency of the clock 102, over a single pulse of the sync clock 104, may have to be equal or at least about equal to the specific frequency F2a, e.g., as discussed with respect to FIG. 2A. For example, in some embodiments, in FIG. 3A, to maintain consistency and clock synchronization between various clock domains, an average number of clock pulses of the clock 102, over a single pulse of the sync clock 104, may have to be equal or at least about equal to a target number Na, e.g., as discussed with respect to FIG. 2A.

In some embodiments, the frequency of the clock 102 may be varied dynamically, as illustrated in FIG. 3A. For example, within a first clock period of a first clock pulse of the sync clock 104, the frequency of the clock 102 may be (i) equal to about F2b for about a first time-duration and (ii) equal to about F2c for about a second time-duration, e.g., such that an average frequency of the clock 102 may still be equal to about F2a within the first clock period of the first clock pulse of the sync clock 104.

For example, assume that for the average frequency of the clock 102 to be F2a, there may be Na number of clock pulses of the clock 102 within a single clock pulse of the sync clock 104, e.g., as illustrated in FIG. 2A. As illustrated in FIG. 3A, the clock 102 may have Nb number of clock pulses at the frequency of F2b and have Nc number of clock pulses at the frequency of F2c. In an example, (Nb+Nc) may be equal to Na. In the example of FIG. 3A, Nc=1 (which is merely an example), e.g., the last clock pulse of the clock 102 within a clock pulse of the sync clock 104 may be stretched. To compensate for the stretching of the Nc clock pulses, the Nb clock pulses may be marginally shortened (e.g., compared to the clock pulses in FIG. 2A). Merely as an example, the frequency F2b may be about 2.5% lower than the frequency F2a. For example, frequency F2a of FIG. 2A may be a target frequency, and an average of the frequencies F2b and F2c may be substantially equal to F2a (e.g., by ensuring that Nb+Nc is substantially equal to Na).

In some embodiments and referring to FIG. 2A, for the clock pulses of the clock 102 to be aligned to the sync clock 104, the target frequency F2a may have to be an integer multiple of the frequency F4 of the sync clock 104. However, the frequencies F2b and F2c of FIG. 3A need not be integer multiples of the sync clock 104. In some embodiments, the target frequency F2a may be an integer multiple of the binning frequency of the DTC 112, but the frequencies F2b and F2c of FIG. 3A need not be integer multiples of the binning frequency of the DTC 112.

Although FIG. 3A illustrates stretching of the last clock pulse of the clock 102 within a clock pulse of the sync clock 104, any one or more clock pulses of the clock 102 (e.g., a first clock pulse, a middle clock pulse, etc.) may be stretched instead.

Thus, over a single clock pulse of the sync clock 104, the average frequency of the clock 102 may remain at F2a (and the total number of clock pulses 102 may remain at Na), although the actual frequency may be dynamically varied between F2b and F2c.

Referring to FIG. 3B, in the PSD graph 320, the X axis represents the frequency of the clock 102, and the Y axis represents the power or energy of the clock 102. As the clock 102 is operated at the frequencies F2b and F2c, the graph 320 may have non-zero energy at or near these two frequency (and may also have non-zero energy at harmonics of these frequencies, although not illustrated in FIG. 3B). For example, in the example of FIG. 3A, the number of clock pulses Nb may be higher than the number of clock pulses Nc, and hence, the energy at frequency F2b may be higher than the energy at the frequency F2c. In some embodiments and as illustrated in FIGS. 3A and 3B, because there is no clock signal at the frequency F2a and hence, no energy at the frequency F2 or it's harmonics, the dynamically frequency varying clock 102 of FIG. 3A may not cause interference with wireless signals communicated by the component 110 at the frequency F2a.

Thus, in FIG. 3A, synchronization between the clock 102 and the sync clock 104 (and hence, synchronization between the clock 102 and the clock 103) may be maintained by ensuring that the average frequency of the clock 102, over individual clock pulses of the sync clock 104, is maintained at the frequency F2a. Yet, because the clock 102 does not operate at this frequency F2a, the dynamically frequency varying clock 102 of FIG. 3A may not cause interference with wireless signals communicated by the component 110 at the frequency F2a.

In an example, the process of rapidly varying the frequency of the clock 102 over a single clock pulse of the sync clock 104, yet keeping an average of the frequency to substantially a target frequency, is also referred to as Adaptive Clock Technology (ACT). In some embodiments, the target frequency (which, for example, is F2a) may be constant, or may vary with time. Nonetheless, the average of the frequency of the clock 102 may track the target frequency.

In some embodiments, such rapid dynamic variation of the clock 102 may not be achievable by a conventional PLL, but may be achievable by the DTC 112. For example, a conventional PLL may have a long frequency transition time, e.g., when the PLL switches from one frequency to another. During such a frequency transition, the frequency behavior of the clock signal generated by the PLL may be unpredictable. Thus, it may not be possible to rapidly change frequency of a clock signal generated by the PLL. In contrast, the DTC 112 may be used to vary the clock 102 rapidly with time, thereby being able to achieve the rapid variation in frequency, as discussed with respect to FIG. 3A.

Referring again to FIG. 1, in some embodiments, the command word 112b may be dynamically varied to vary the frequency of the clock 102. For example, for the first Nb clock pulses of the clock 102 during a clock pulse of the sync clock 104, the command word 112b may have a first value; and for the remaining Nc clock pulses, the command word 112b may have a second value. This may result in the frequency shift discussed with respect to FIG. 3A.

The illustrations in FIGS. 3A and 3B may be mere examples. In some examples, the values of Nb and Nc may be changed. In some examples, the positions of the Nb and Nc clock pulses may also be varied. In some examples, instead of having only two frequencies F2b and F2c, the clock 102 may have more than two frequencies within a single clock pulse of the sync clock 104, e.g., as long as the average of these are equal to about F2a (e.g., as long as there are Na number of clock pulses within a single clock pulse of the sync clock 104).

A frequency shift resolution of the DTC 112 (e.g., how finely can the DTC 112 change the frequency) may be based on a length of the command word 112b. In some embodiments, a frequency shift resolution of the DTC 112 may be given as follows:

$$\Delta f = f - f' = f - 1/[1/f - 1/[2^{28} \times \text{Fosc}]]. \quad \text{Equation 1.}$$

In equation 1, f may be a current frequency, f' may be a shifted frequency, $\Delta f$ may be a minimum frequency shift (e.g., the frequency shift resolution of the DTC 112), $2^{28}$ may represent a number of bits (28) that may determine the frequency-shift resolution and implemented in a frequency-shift digital algorithm (e.g., which may be associated with a length of the command word 112b), and Fosc may be an input frequency to the DTC 112. In the example of FIG. 1, Fosc may be the frequency F1 of the clock 101.

Merely as an example, for a 2600 MHz (or 2.6 GHz) input frequency, the frequency resolution may be about 5 Hz. Thus, in this example, the DTC 112 may control the frequencies F2a, F2b and/or F2c of FIGS. 2A-3A, e.g., with a frequency resolution of about 5 Hz. In some embodiments, the difference between the frequency F2b and frequency F2a (e.g., as discussed with respect to FIGS. 2A and 3A) may be equal to, or an integer multiple of, Of.

Figure 4C:
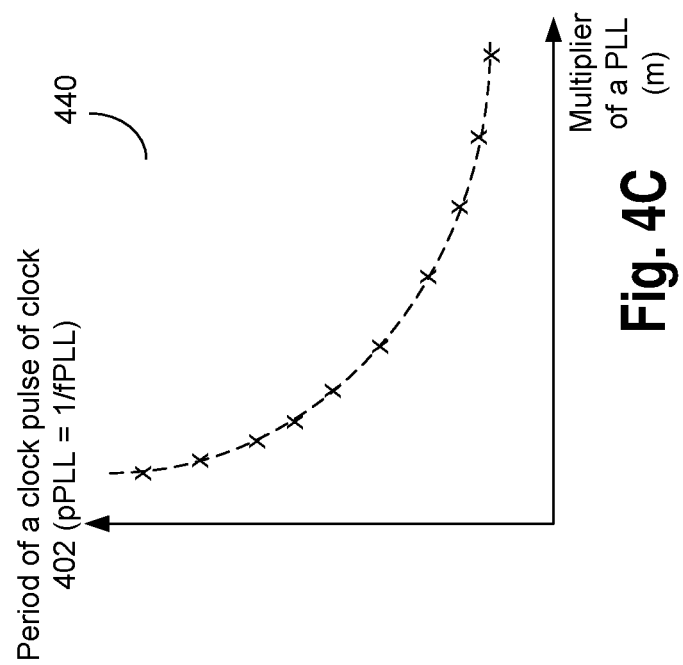
FIG. 4C illustrates a graph illustrating an example relationship between a period of clock pulses of a PLL and a multiplier associated with the PLL.
Figure 4B:
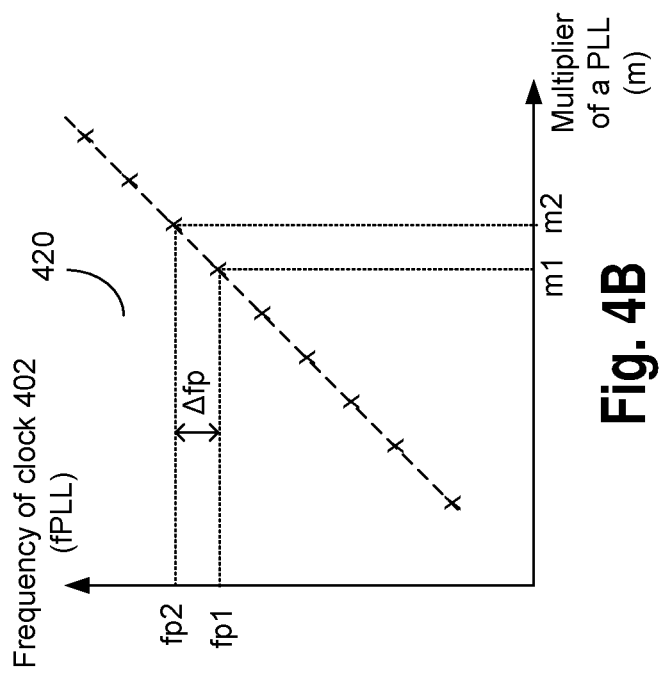
FIG. 4B illustrates a graph illustrating an example relationship between a frequency of a PLL and a multiplier associated with the PLL.
Figure 4A:
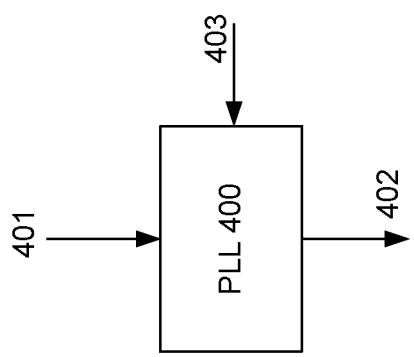
FIG. 4A illustrates a conventional PLL clock generator.

FIG. 4A illustrates a conventional PLL clock generator 400 (also referred to as "PLL 400"). The PLL 400 receives a reference clock 401 and generates a clock 402, e.g., based on a control 403. For example, a frequency of the clock 402 may be varied based on the control 403. Assume that the frequency of the clock 402 is fPLL, and a time period of individual clock pulses of the clock 402 is pPLL. In an example, fPLL=1/pPLL. The control 403 may be a multiplier m (or may provide an indication of a multiplier m), and the frequency of the clock 402 may be m times a frequency of the clock 401.

FIG. 4B illustrates a graph 420 illustrating an example relationship between the frequency of the PLL 400 (Y axis) and the multiplier m associated with the control 403 (X axis); and FIG. 4C illustrates a graph 440 illustrating an example relationship between the period of clock pulses of the PLL 400 (Y axis) and the multiplier m associated with the control 403 (X axis). In some embodiments, the control 403 may linearly, or almost linearly control the frequency of the clock 402. Accordingly, as illustrated in FIG. 4B, the graph 420 illustrates linear or almost linear relationship between the frequency fPLL and the multiplier m of the PLL 400 (e.g., for at least a range of the frequency fPLL). As the period pPLL is equal to 1/fPLL, the graph 440 may have a shape of a hyperbola in FIG. 4C.

FIG. 4B also illustrates a frequency resolution of the PLL 400. For example, for two consecutive multipliers m1 and m2 of the control 403, the frequencies fPLL are fp1 and fp2, respectively. A difference $\Delta fp$ between fp1 and fp2 may represent a frequency resolution of the PLL 400.

FIG. 5A illustrates the DTC 112 of FIG. 1, according to some embodiments. As discussed with respect to FIG. 1, in some embodiments, the DTC 112 may receive a reference clock 101 and may generate a clock 102, e.g., based on a command word 112b and a delay control signal 112d. For example, a frequency of the clock 102 may be varied based on the command word 112b. Assume that the frequency of the clock 102 is fDTC, and a time period of individual clock pulses of the clock 102 is pDTC. In an example, fDTC=1/pDTC. The command word 112b may control the clock period pDTC. The command word 112b may include, or be associated with a number that may control the clock period pDTC, where the number is referred to as nDTC.

FIG. 5B illustrates a graph 520 illustrating an example relationship between the clock period pDTC of the DTC 112 (Y axis) and the number nDTC associated with the command word 112b (X axis), according to some embodiments; and FIG. 5C illustrates a graph 540 illustrating an example relationship between the frequency fDTC of the clock 102 (Y axis) and the number nDTC associated with the command word 112b (X axis), according to some embodiments. In some embodiments, the number nDTC may linearly or almost linearly control the clock period pDTC of the clock 102. Accordingly, as illustrated in FIG. 5B, the graph 520 illustrates linear or almost linear relationship between the clock period pDTC and the number nDTC (e.g., for at least a range of the clock period of the clock 102). As the period pDTC is equal to 1/fDTC, the graph 540 in FIG. 5C may have a shape of almost a hyperbola.

FIG. 5C also illustrates a frequency resolution of the DTC 112. For example, for two consecutive values of the number nDTC, the frequencies fDTC are fd1 and fd2, respectively. A difference $\Delta fd$ between fd1 and fd2 may represent a frequency resolution of the DTC 112.

Frequency binning may be a parameter of interest in a computing system that may affect a performance and/or functionality of the computing system. Small frequency bins may enable efficient voltage tracking. Merely as an example, assume that the DTC 112 can generate frequencies of 500 MHz, 510 MHz, 520 MHz, 530 MHz, and so on. Thus, the resolution of the DTC 112 may be 10 MHz, which may represent a frequency binning of the DTC 112.

In a clock-generator based on a PLL (e.g., the PLL 400 of FIG. 4), the frequency bins may be determined by a frequency of the reference clock 401. For example, reduced frequency bins may be generated by dividing the frequency of the clock 401 by a ratio of M (where M may be based on the control 403). However, this may require multiplying a feedback ratio of the PLL 400 by a factor of M. However, multiplying the feedback ratio may impact the performance of a convention PLL, e.g., may result in decreased stability, increased jitter and/or increased lock-time of the PLL 400.

In some embodiments, the DTC 112 may provide generation of flexible binning. For example, the DTC 112 may allow operation with lower frequency bins, without degrading the clock performance. As illustrated in FIGS. 5A and 5B, the DTC 112 may provide a clock binning that may be linear-binning based on the clock period (e.g., clock period pDTC). For example, the DTC 112 may have linear or about linear binning in time domain.

For example, the frequency bins of the PLL 400 may be about 100 MHz (e.g., based on PLL-based clock generator input clock frequency). When using a DTC-based clock generator (e.g., the DTC 112), the frequency bins may be reduced to, for example, 33 MHz, or even lower. However, unlike a PLL, such a reduction in the frequency bins in the DTC 112 may not be followed by a performance degradation.

Assume an input frequency to a DTC (e.g., the DTC 112) is Fin (e.g., in FIG. 1, Fin is F1), and an output frequency of the DTC is Fo (e.g., in FIG. 1, Fo=F2). Also, assume that the clock change circuitry 112a is a frequency divider circuitry that may divide the input frequency Fin by a combination of an integer number and/or a fraction number. Assume that the division ratio of the clock change circuitry 112a is given by a number DTC_division_ratio. In some embodiments, the DTC_division_ratio may be based on the command word 112b.

As discussed with respect to FIGS. 4A-5B, unlike a DTC, in a conventional PLL the frequency may vary linearly or about linearly with the multiplication ratio. In some embodiments, to generate frequency bins (e.g., like a PLL), the output frequencies Fo of the DTC 112 may be a limited set of frequencies with a pre-defined frequency-bin separation. The frequency-bin separation may be a multiplication of a reference frequency (Fref), which may be a system clock that is used for synchronization among various clock domains (e.g., a global alignment clock such as the sync clock 104 of FIG. 1). In some embodiments, the output frequency Fo of the DTC 112 may follow the following equations:

$$Fo = Fin/DTC\_division\_ratio. \quad \text{Equation 2}$$

$$F\_Bin = N \times Fref \quad \text{Equation 3}$$

In some embodiments, Fref may be a reference frequency associated with the DTC 112. For example, the frequency Fref may be a multiple (e.g., integer multiple) of the frequency F4 of the sync clock 104. In some embodiments, frequency F_Bin may be a desired frequency binning of the DTC 112. Assume that output frequency Fo of the clock 102 is equal to F_Bin (e.g., the DTC 112 outputting the binning frequency F_Bin). N is assumed to be a multiplier, where the binning frequency F_Bin may be N times the reference frequency Fref. Then substituting equation 3 in equation 2, one arrives at the following:

$$DTC\_division\_ratio = Fin/(N \times Fref). \quad \text{Equation 4}$$

Merely as an example, assume a reference frequency Fref of 33 MHz for the DTC 112, and an input frequency Fin of the clock 101 of 5 GHz. Thus, plugging these values in equation 4, the DTC_division_ratio may be represented as follows:

$$DTC\_division\_ratio = 5E^6/(N \times 33E^6). \quad \text{Equation 5}$$

In some embodiments, the DTC_division_ratio may have an integer portion and a fractional portion. In some embodiments, these two portions of the DTC_division_ratio may be determined as follows in equations 6 and 7, respectively:

$$DTC \text{ integer division} = \text{Round } [5E^6/(N \times 33E^6)], \quad \text{Equation 6}$$

$$DTC \text{ fractional division} = \text{Round } \{[5E^6/(N \times 33E^6)] - \text{Round } [5E^6/(N \times 33E^6)]\} \times 2^{28}\}. \quad \text{Equation 7}$$

In equation 7, in some embodiments, the $2^{28}$ may represent a number of bits (e.g., 28 bits) in, for example, the command word 112b, which may determine a resolution or accuracy of the output frequency F0.

In some embodiments, in the case of generating time domain binning, the cycle time of the output clock 102 may determined as follows:

$$Tout = Tin \times DTC\_division\_ratio, \quad \text{Equation 8}$$

$$Tout = K \times Tin + J \times [Tin/2^{28}], \quad \text{Equation 9}$$

where Tout and Tin may be the cycle period of the input clock 101 and output clock 102 of the DTC 112 (e.g., Tput and Tin may respectively be a reciprocal of the respective frequencies), and equation 8 may be derived from equation 2. In equation 9, K and J may be integer numbers that may be calculated from equations 6 and 7.

In some embodiments, equations 8 and 9 provide a time domain binning of the DTC 112. For example, conventional PLL may implement a frequency binning (e.g., an output frequency of the PLL may be about N times a reference frequency). The performance change in the PLL (e.g., due to a change in the frequency) may be proportional to ΔF/Foutput (e.g., where ΔF may be a change in the frequency), which may dictate that shifting 1-bin at high frequency may less affect the performance than changing the 1-bin at low frequency. In contrast, equations 8 and 9 may enable generation of equal-performance bins with respect to clock periods, e.g., by determining ΔT/Tcycle (e.g., in percentage), where ΔT may represent a change in clock period, and Tcycle may represent the clock period of the DTC 112. This, for example, may allow a time-domain binning scheme that may allow flexible binning regime.

FIG. 6 illustrates a system 600 comprising two DTCs operating in open loops, according to some embodiments. For example, DTCs 620 and 640 may receive input clock signal 602 from an appropriate source (e.g., from a PLL, or another appropriate clock generation system), and respectively output clocks 622 and 642.

In some embodiments, the clock 622 may be propagated to components 626a, 626b, . . . , 626N via, for example, a clock network 624 (which may be, for example, a balanced clock tree). Similarly, the clock 642 may be propagated to components 646a, 646b, . . . , 646M via, for example, a clock network 644 (which may be, for example, a balanced clock tree).

In some embodiments, the clock networks 624 and 644 may have some delay in propagating the respective clock signals 622 and 642 to the respective components. For example, the clock network 624 may output a clock 622a to the components 626a, . . . , 626N, where the clock 622 may be a delayed version of the clock 622. Similarly, in an example, the clock network 644 may output a clock 642a to the components 646a, . . . , 646M, where the clock 642a may be a delayed version of the clock 642. In some embodiments, the delay of the clock network 624 may be different from the delay of the clock network 644 (e.g., due to difference in topology of the two clock networks, a change in system voltage and/or frequency, etc.).

In some embodiments, the DTCs 620 and 640 may be programmed to generate the respective clock outputs at substantially the same frequency (e.g., by controlling the respective command words to these DTCs). However, even if the clocks 622 and 642 of the two DTCs 620 and 640 may have same frequency, there may be phase difference between these two clock signals. For example, the phase difference may be due to a start time at which the DTCs 620 and 640 start generating the respective clock signals, and/or for any other reason. Additionally or alternatively, the delays of the clock networks 624 and 644 may be different. In some embodiments, for these reasons, the phases of the clocks 622a and 642a may not be aligned.

For example, clock 622a may be a clock in a domain 1 (e.g., the clock domain of the components 626a, ..., 626N), and clock 642a may be a clock in a domain 2 (e.g., the clock domain of the components 646a, ..., 646M). A time t0 of the domain 1 clock may refer to a rising edge of a clock pulse of the clock 622a, and a time t0 of the domain 2 clock may refer to a corresponding rising edge of a clock pulse of the clock 642a. Due to the two clocks 622a and 642a not being aligned, the time t0 of domain 1 may not be aligned to the time t0 of domain 2.

In some embodiments, frequency and/or voltage level of a system may be dynamically controlled or changed often, e.g., tens, hundreds, or even thousands of time per seconds. For example, the voltage level may be elevated to support turbo modes of operation of a processor (e.g., when the frequency may go up), and the voltage level may be lowered to reduce power consumption and heating when the frequency goes down. Voltage may be changed with or without a corresponding change in frequency, and frequency may be changed with or without a corresponding change in voltage.

With the implementation of on-die integrated voltage regulator (FIVR), the voltage change rate may be few volts per microsecond, and delay of a single inverter may change by a factor of 2-3 when voltage level changes between 1 v to 0.5 v. Consequently, a delay of a clock distribution (e.g., which may be built of multiple clock inverters) may change rapidly, based on a change in the voltage level. For example, the delay of a clock network (e.g., one or both of the clock networks 624 and 644) may change by a few nanoseconds, e.g., within less than a micro-second. As a result, the clock 622a may, for example, drift out of phase with respect to the clock 642a. If conventional PLLs are used (e.g., instead of the DTCs 620 and 640), phase re-lock process may be activated, e.g., in order to re-gain synchronism between the two clock domains and to ensure alignment between clock domains that are supplied by different voltages or run at different frequencies. If conventional PLLs are used (e.g., instead of the DTCs 620 and 640), phase re-lock process may be activated for realignment, which may be a time-consuming process, which may make the process of frequent changes in frequency and/or voltage infeasible. Also, in some embodiments, due to no feedback in the system 600 of FIG. 6, the open loop system 600 may also not address the problem associated with re-alignment of the clocks 622a and 642a.

Figure 7A:
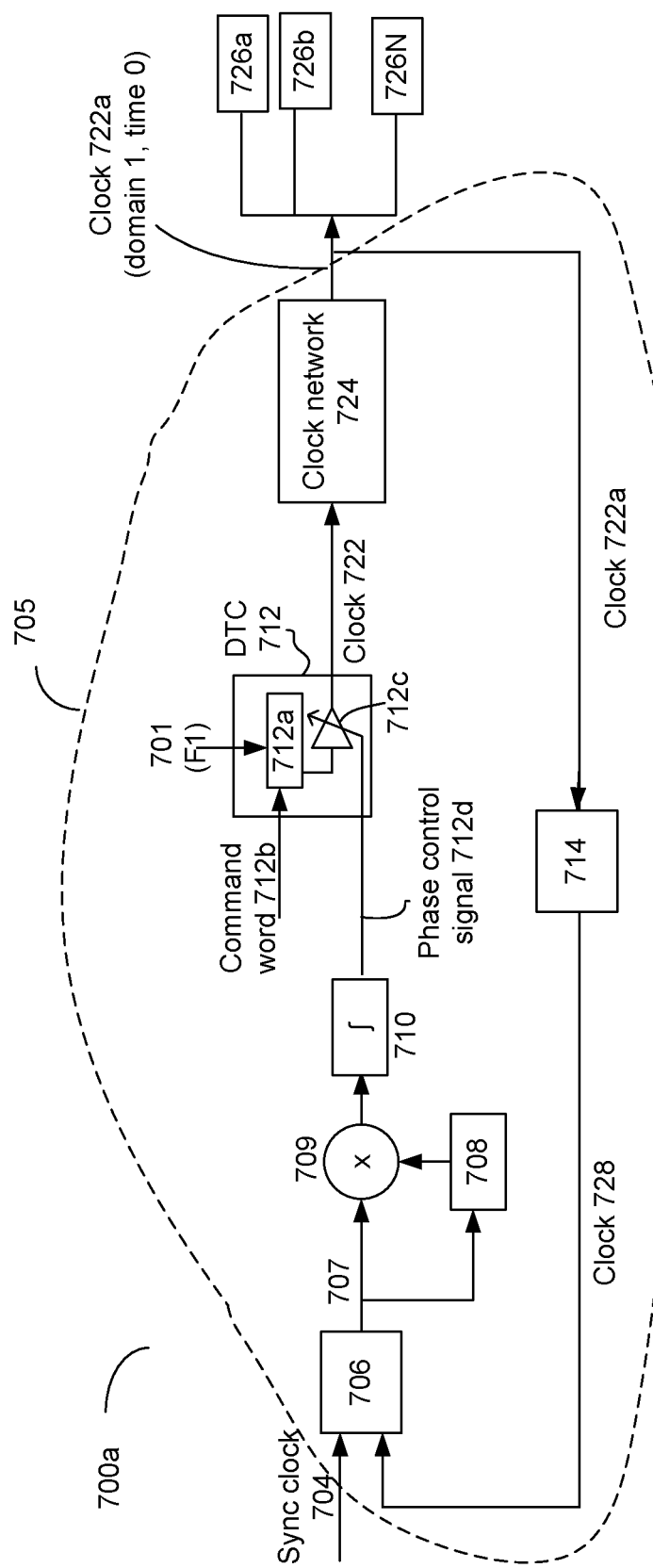
FIG. 7A illustrates a system comprising a DTC operating in a closed loop that is adapted for relatively slow drift in clock alignment, according to some embodiments.
Figure 7B:
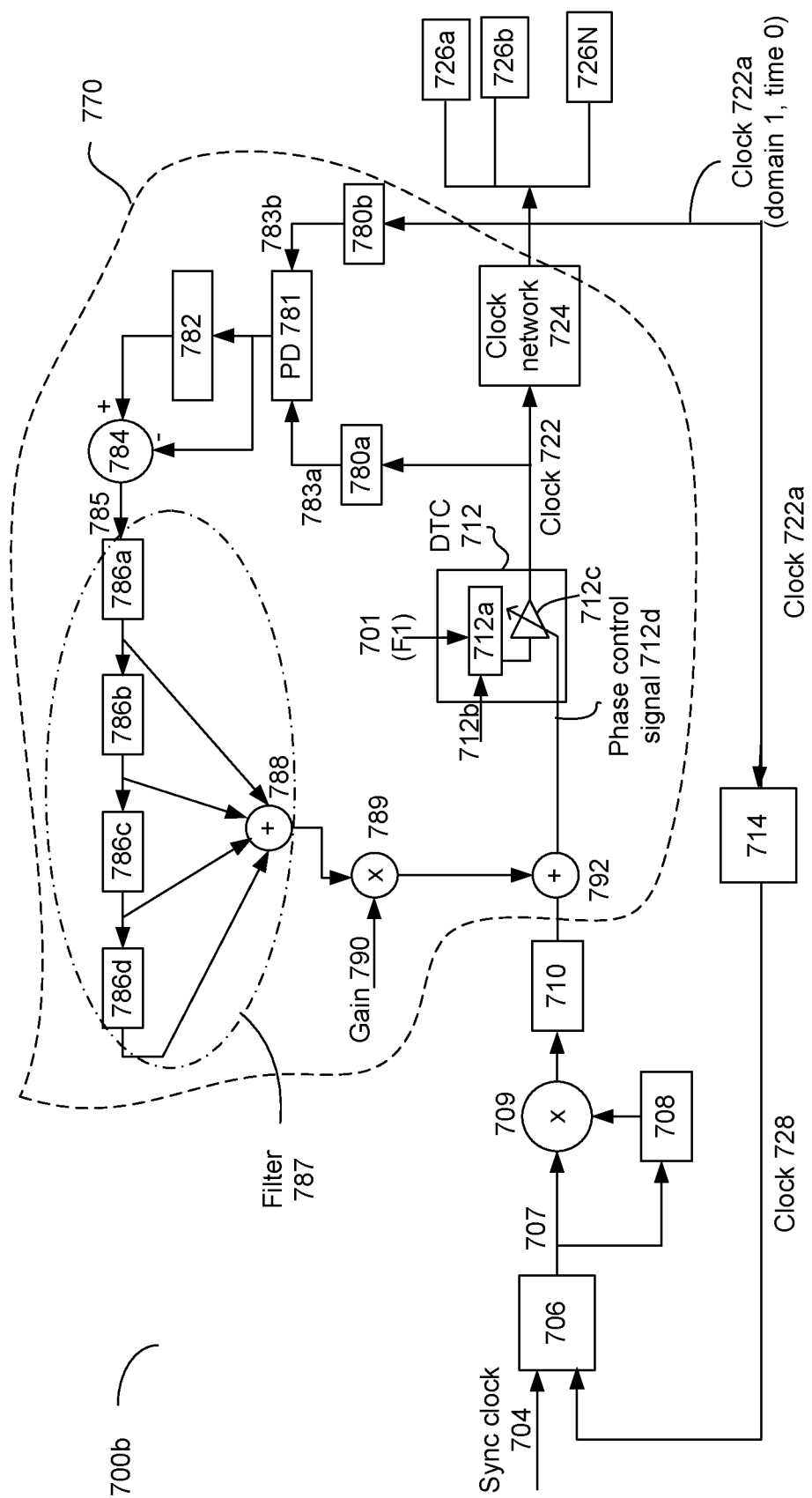
FIG. 7B illustrates a system comprising a DTC operating in a closed loop that is adapted for relatively fast drift in clock alignment, according to some embodiments.

In some embodiments and as illustrated in FIGS. 7A and 7B, the clocks 622a and 642a may be synchronized by, for example, aligning each of these clocks with a common synchronization clock. For example, the clock 622a may be aligned to the synchronization clock, and the clock 642a may also be aligned to the same synchronization clock. As a result, the clocks 622a and 642a may be aligned or synchronized to each other.

FIG. 7A illustrates a system 700a comprising a DTC operating in a closed loop that may be adapted for relatively slow drift in clock alignment, according to some embodiments; and FIG. 7B illustrates a system 700b comprising a DTC operating in a closed loop that may be adapted for relatively fast drift in clock alignment, according to some embodiments. Referring to FIG. 7A, illustrated is a DTC 712, a clock distribution network 724 (also referred to herein as clock network 724), and components 726a, ..., 726N to which a clock generated by the DTC 712 is supplied.

In some embodiments, the DTC 712 comprises a clock change circuitry 712a and a delay element 712c. The DTC 712 may receive an input clock 701 with a frequency F1 and a command word 712b, based on which the DTC 712 may generate a clock 722. A phase of the clock 722 may be adjusted by the delay element 712c, which may be tuned by a phase control signal 712d. The components and operation of the DTC 712 may be at least similar to those of the DTC 112 of FIG. 1, and hence, the DTC 712 will not be discussed in further details herein.

The clock network 724 may have a delay, which may change with, for example, a change in the system voltage, frequency, temperature, aging, and/or the like. Accordingly, the clock 722a supplied to the components may be a delayed version of the clock 722.

In some embodiments, the system 700a may comprise a phase detector (PD) 706. In some embodiments, the PD 706 may receive a synchronization clock (sync clock) 704. The sync clock 704 may be similar to the sync clock 104 of FIG. 1. In some embodiments, the clock 722a may be synchronized with the sync clock 104.

In some embodiments, the PD 706 may also receive a feedback of the clock 722a. In some embodiments, the clock 722a may have a frequency that may be higher than the frequency of the sync clock 704. For example, the clock 722a may have a frequency that is an integer multiple of the frequency of the sync clock 704. In some embodiments, a divider circuitry 714 may receive the clock 722a and may generate a clock 728 such that a frequency of the clock 728 is lower than a frequency of the clock 722a.

Merely as an example, the sync clock 704 may have a frequency of about 8.33 MHz, whereas the clock 722a may have a frequency of about (N×33.33 MHz), where N is an integer. The circuitry 714 may divide the frequency of the clock 714 by 4, e.g., such that the clock 728 has a frequency of about (N×8.33 MHz). In some embodiments, the circuitry 714 may be optional and may not be used.

In an example, the PD 706 may be a bang bang phase detector. For example, the PD 706 may compare the phases of the sync clock 704 and the clock 728. If, for example, the phase of the sync clock 704 leads the phase of the clock 728, the PD 706 may output a first value (e.g., +1). Also, if, for example, the phase of the sync clock 704 lags the phase of the clock 728, the PD 706 may output a second value (e.g., −1). For example, the PD 706 may output a single bit value that indicates whether currently the phase of the sync clock 704 leads or lags the phase of the clock 728.

In some embodiments, a filter 708 may receive an output 707 of the PD 706. A multiplier 709 may multiply the output 707 of the PD 706 and an output of the filter 708. The filter 708 may be any appropriate type of filter that may change the filter coefficients, e.g., based on the output 707. Merely as an example, if the phase of the sync clock 704 leads the phase of the clock 728 for P number of consecutive times, the filter 708 may change the coefficients such that the DTC 712 may aim to advance the phase of the clock 722, where P may be an appropriate integer. In another example, if the phase of the sync clock 704 lags the phase of the clock 728 for Q number of consecutive times, the filter 708 may change the coefficients such that the DTC 712 may aim to delay the phase of the clock 722, where Q may be an appropriate integer. Any other type of filtering scheme may also be used. For example, the filter 708 may have a pole at the origin, and may employ a gear shift mechanism to speed up the lock time of the loop of system 700a.

In some embodiments, the output of the multiplier 709 may be processed by an integrator 710. Merely as an example, if the output of the PD 706 is almost equally divided between +1's and −1's, then the integrator output 710 may be zero or about zero, implying that no correction in the phase of the clock 722 may be necessary. However, if the phase of the clock 728 leads (or lags) the phase of the sync clock 704, this may be reflected in the output of the integrator 710 (e.g., reflected in the phase control signal 712d), based on which the DTC 712 may perform appropriate correction such that the phase of the clock 722a may be substantially aligned to the phase of the sync clock 704. In some embodiments, the system 700a may be adapted for adjusting or re-adjusting misalignment of the clock signal 722a that may occur in a relatively slow manner, e.g., due to a temperature change, aging of the system 700a, etc. In an example, the closed loop of FIG. 7A (illustrated using dotted lines) may also be referred to herein as a slow DTC phase locking loop 705, or simply as a slow loop 705. The slow loop 705 may ensure that the clock 722a is substantially aligned with the sync clock 704, even if, for example, the clock network 724 changes gradually or relatively slowly with time (e.g., due to a temperature change, aging, etc.).

Referring now to FIG. 7B, illustrated is the system 700b comprising the DTC 712 operating in a closed loop 770 adapted for relatively fast drift in clock alignment, according to some embodiments. In some embodiments, the system 700b may comprise the components of the slow loop 705 illustrated in FIG. 7A. In some embodiments, in addition to the components of the slow loop 705 of the system 700a of FIG. 7A, the system 700b may comprise the closed loop 770 (illustrated using dotted line) adapted for relatively fast drift in clock alignment. The closed loop 770 may also be referred to herein as a fast clock delay compensation (FCDC) loop 770, or simply as a fast loop 770.

In some embodiments, the fast loop 770 may comprise a division circuitry 780a to receive the clock 722, and output a clock 783a by dividing the clock 722 by a divider. In some embodiments, the fast loop 770 may also comprise another division circuitry 780b to receive the clock 722a, and output a clock 783b by dividing the clock 722a by the same divider. In some embodiments, the fast loop 770 may comprise a phase detector (PD) 781. In an example, unlike the PD 706 (which, for example, was a bang-bang phase detector that provided indication of which of the two inputs is leading or lagging in phase), the PD 781 may receive two inputs, and provide an indication of an amount of phase lead or phase lag of one input with respect to another input. In some embodiments, the PD 781 may be a digital phase detector, e.g., a time to digital convertor (TDC).

Figure 8:
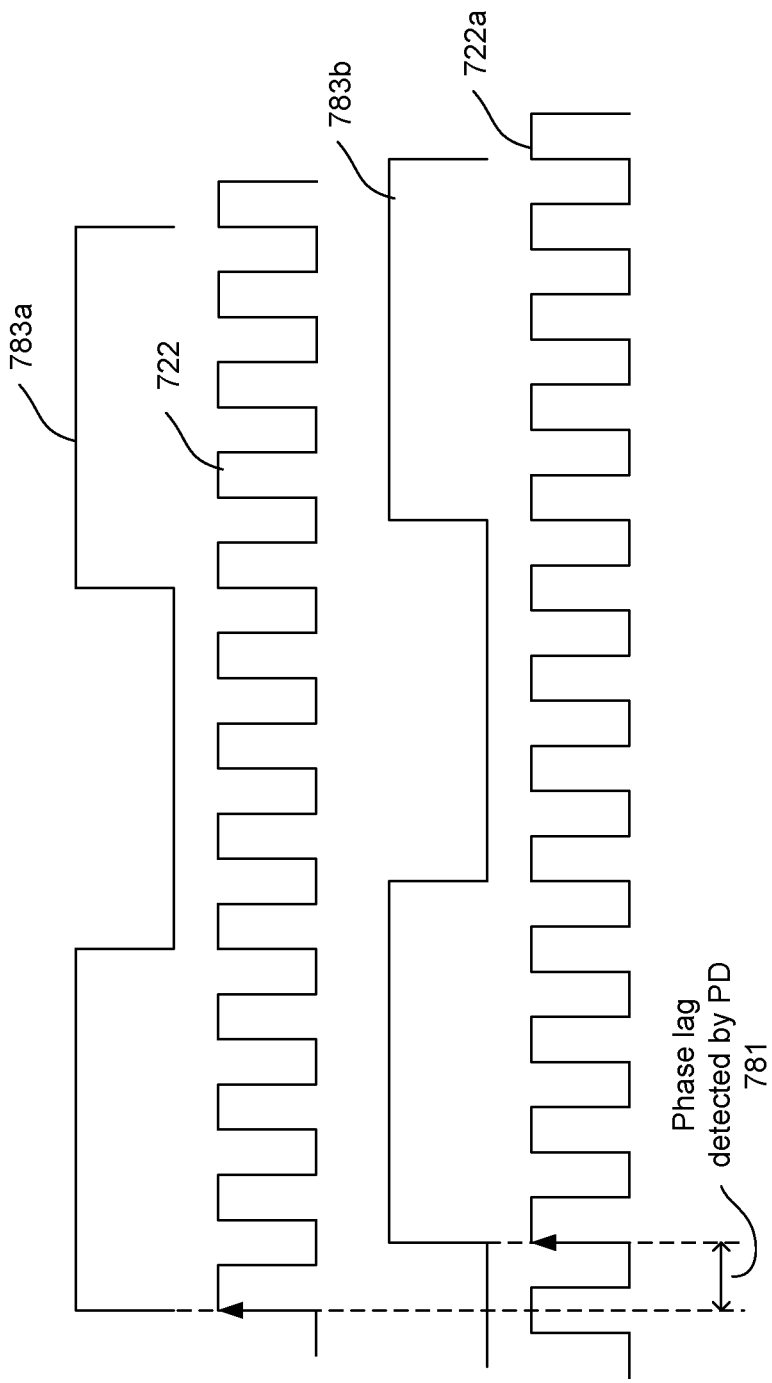
FIG. 8 illustrates a timing diagram illustrating an operation of division circuitries, and a phase detector, according to some embodiments.

FIG. 8 illustrates a timing diagram illustrating an operation of the division circuitries 780a and 780b, and the PD 781, according to some embodiments. In the example of FIG. 8, the division circuitries 780a and 780b may divide the clocks 722 and 722a, respectively, by a factor of eight, to respectively generate the clocks 783a and 783b. The PD 706 may detect a phase difference between rising edges of the clocks 783a and 783a. Merely as an example, the output of the PD 706 may measure a time difference between rising edges of the clocks 783a and 783b, as illustrated in FIG. 8.

In some embodiments, the division factor in the division circuitries 780a and 780b (which, for example, is eight in FIG. 8) may be larger than a largest delay change in the clock signals, e.g., in order to avoid wraparound of the output clocks of the division circuitries 780a and 780b. For example, a clock period of the clocks 783a and 783b may be longer than a total possible delay in the clock network 724.

Referring again to FIG. 7B, in some embodiments, an output of the PD 781 may be stored temporarily in a component 782. The component 782 may be a register, a flip flop, a delay element, and/or the like. For example, the component 782 may, at any given clock cycle, store the output of the PD 781, and output the stored value at a next clock cycle. Thus, an output of the component 782 may be a delayed version of the output of the PD 781 (e.g., delayed by a clock cycle).

A subtraction circuitry 784 may receive the output of the component 782 and also the output of the PD 781, and may determine a difference between the output of the component 782 and the output of the PD 781. Also, the output of the component 782 may be a delayed version of the output of the PD 781. Thus, an output 785 of the subtraction circuitry 784 may provide an indication of a change in the output of the PD 781 over a period of time (e.g., over a clock cycle).

Also, the output of the PD 781 may be representative of a delay in the clock signals 722 and 722a, e.g., delay in the clock network 724. Thus, in an example, the output 785 of the subtraction circuitry 784 may be representative of a sudden or rapid change in the delay in the clock network 724. In some embodiments, the delay in the clock network 724 may change suddenly or rapidly, for example, due to a sudden change in an operating frequency, sudden change in an operating voltage, and/or the like. In some embodiments, the fast loop 770 may be configured to react to the change in the delay in the clock network 724, e.g., by reacting to the output 785.

In some embodiments, the output 785 may be processed by a filter 787 (e.g., illustrated using dashed and dotted lines). The filter 787 may be, for example, a tap filter and/or a low pass filter. In some embodiments, the filter 787 may comprise a plurality of components 786a, . . . , 786d (generally referred to as component 786 or components 786) connected in series. The components 786 may be, for example, flip flops. As illustrated in the figure, the component 786a may receive the output 785. An output of the component 786a may be received by the component 786b, an output of the component 786b may be received by the component 786c, and an output of the component 786c may be received by the component 786d. A component 786 may receive an input, and provide the input to the output with a delay. In some embodiments, the components 786 may receive respective clock signals for operation, although not illustrated in FIG. 7B. In some embodiments, the outputs of the components 786 may be summed in a summation circuitry 788. Thus, in some embodiments, an output of the circuitry 788 may represent a filtered version of the output 785.

In some embodiments, the output of the circuitry 788 may be weighted (e.g., in a multiplication circuitry 789) by a gain 790. A summation circuitry 792 may receive the output of the multiplication circuitry 789, and add to the output of the integrator 710. An output of the summation circuitry 792 may be used as a phase control signal 712*d* for the DTC 712.

Although FIG. 7B illustrates an example implementation of the filter 787, any other structure of the filter 787 may also be possible. Merely as an example, instead of four of the components 786, in some embodiments, the filter 787 may comprise two, three, five, or more instances of the component 786. In some embodiments, the filter 787 may be absent, and the multiplication circuitry 789 may directly multiply the gain 790 with the output 785.

In some embodiments, FIG. 7B illustrates a combination of the fast loop 770 and the slow loop 705 (e.g., the slow loop 705 is not labeled in FIG. 7B for purposes of illustrative clarity, although the slow loop 705 is labeled in FIG. 7A). As discussed herein, the slow loop 705 may be used to mitigate slow changes in the delay of the clock network 724 and/or maintain synchronization between the sync clock 704 and the clock 722*a*. On the other hand, the fast loop 770 may react to and compensate for any rapid or fast change in the delay of the clock network 724.

The DTC 712, along with the fast loop 770, may react to rapid change in the delay of the clock network 724 by changing a phase of the clock 722, e.g., such that synchronization is maintained between the sync clock 704 and the clock 722*a*. In contrast, a convention PLL may not be able to react so fast to changes in propagation delays in a clock distribution network, e.g., because a conventional PLL may not be able to change a phase of a generated clock signal rapidly. The DTC 712 may change a phase of the clock 722 rapidly based on the phase control signal 712*d*, which may enable the DTC 712 to react to rapid change in the delay of the clock network 724.

In some embodiments, the fast loop 770 may react to and compensate for any rapid or fast change in the delay of the clock network 724. In an example, the fast loop 770 (and various components therein) may not be of much value when there is small or no substantial change in the delay of the clock network 724. For example, the delay of the clock network 724 may change based on a change in an operating frequency, an operating voltage, etc. Thus, in some embodiments, the fast loop 770 may be switched off when, for example, no change in the delay of the clock network 724 is anticipated (e.g., no change in parameters that may result in change in the delay of the clock network 724). However, when changes in one or more parameters (e.g., change in frequency, voltage, etc.) is anticipated to occur that may change the delay of the clock network 724, the fast loop 770 may be switched on or enabled.

In some embodiments, the fast loop 770 in FIG. 7B may react to a change in a delay of the clock network 724, where the output 785 may represent the change in the delay of the clock network 724. However, in some other embodiments (and although not illustrated in FIG. 7B), the fast loop 770 may be modified such that the fast loop may react to the actual delay of the clock network 724.

For example, in such embodiments, the output of the PD 781 (which may be representative of the delay in the clock network 724) may be supplied to the filter 787. In an example, in such embodiments, the components 782 and 784 may not be present. The fast loop 770 may react to the actual delay of the clock network 724, instead of reacting to the change in the delay. For example, the system may compensate for the delay in the clock network 724, such that the sync clock 704 and clock 722 are synchronized. Any change in the delay in the clock network 724 may also be compensated in such embodiments.

Referring again to FIG. 1, in some embodiments, the command word 112*b* may be varied such that the frequency F2 of the clock 102 may vary with time. For example, FIG. 9 illustrates a variation in the frequency F2 of the clock 102 output by the DTC 112, according to some embodiments. For example, during a first time-period ta, the frequency of the clock 102 has a first value; during a second time-period tb, the frequency of the clock 102 has a second value; and during a third time-period tc, the frequency of the clock 102 has a third value, where the first, second, and third values are different from each other. In some embodiments, the variation in frequency may be achieved by appropriately varying the command word 112*b*.

In some embodiments, to ensure frequency jump while maintaining synchronization with the sync clock 104, a counter may be implemented in a DTC. FIGS. 10A and 10B illustrate an example DTC 112 associated a counter 1002 and an edge detector 1004, according to some embodiment. Various components illustrated in FIGS. 10A-10B are similar to the components illustrated in FIG. 1, and hence, and labeled similarly in these two figures.

Additionally, in the embodiments of FIG. 10A, the DTC 112 comprises the counter 1002 that may detect a number of clock pulses of the DTC output clock 102 within individual clock pulses of the sync clock 104. In some embodiments, the DTC comprises the edge detector 1004 that may output an edge detection signal 1006, which may indicate a rising edge of the sync clock 104.

Although the counter 1002 and the edge detector 1004 are illustrated to be included within the DTC 112 in FIG. 10A, in some embodiments, one or both these components may be external to the DTC 112. For example, in the embodiments of FIG. 10B, the counters 1002 and the edge detector 1004 may be external to the DTC 112. For example, these components may be within a controller 1001 that may generate the command word 112*b*.

In some embodiments, a change in frequency, or a frequency jump of the DTC output clock may be aligned with a rising edge of the sync clock 104. In some other embodiments, a change in frequency, or a frequency jump of the DTC output clock may not be aligned with a rising edge of the sync clock 104. Both the scenarios are discussed herein in detail.

FIG. 11 illustrates a timing diagram of an output clock 102 of the DTC 112, where a frequency change in the output clock 102 is aligned with rising edges of the sync clock 104, according to some embodiments. Merely as an example, as illustrated in FIG. 11, during a first clock cycle of the sync clock 104, the clock 102 has a first frequency such that 24 clock cycles of the clock 102 are within the first clock cycle of the sync clock 104. In another example, as illustrated in FIG. 11, during a second clock cycle of the sync clock 104, the clock 102 has a second frequency such that 12 clock cycles of the clock 102 are within the second clock cycle of the sync clock 104; and during a third clock cycle of the sync clock 104, the clock 102 has a third frequency such that 4 clock cycles of the clock 102 are within the third clock cycle of the sync clock 104. The counter 1002 keeps count of the number of clock cycles of the clock 102 within individual clock pulses of the sync clock 104.

In some embodiments, when a count N of the counter 1002 reaches 24 (e.g., at the end of the first clock period of the sync clock 104), the counter 24 may be reset to zero and the DTC 112 may change the frequency of the clock 102. In some embodiments, the counter 1002 may be reset based on the edge detection signal 1006, which may detect a rising edge of the sync clock 104 and generate a pulse. In some embodiments, the change in the frequency of the DTC 112 output clock 102 may be based on the counter 1002 reaching a threshold limit (e.g., 24 in the first clock cycle of the sync clock 104, 12 in the second clock cycle, and 4 in the third clock cycle).

In some embodiments, the counter 1002 may be synchronized with the sync clock 104 periodically, intermittently, during boot-up, after the slow loop 705 is locked, when synchronization may be suspected to be lost for some reason, and/or at another appropriate time. For example, the synchronization between the sync clock 104 and the counter 1002 may be achieved using the edge detection signal 1006 or by some other means, as discussed herein in further detail later.

In some embodiments, when the counter 1002 is synced with the sync clock 104, the frequency of the clock 102 may be changed at the rising edges of the sync clock 104, and the counter 1002 may be set for a new threshold value (e.g., based on the frequency). The counter 1002 may reset after reaching the threshold value (which may indicate that the next rising edge of the sync clock 104 has reached), and the DTC 112 may again change the frequency output.

In some embodiments, an input clock to the counter 1002 may be the clock 102 output by the DTC 112. Accordingly, if and when the phase of the clock 102 is adjusted by the DTC 112, the phase of the counter input clock may also adjust. Accordingly, the counter 1002 may still be in sync with the sync clock 104. In some embodiments, changing the frequency with the rising edge of the sync clock may, for example, ensure that synchronization with the sync clock 104 is maintained.

Figure 12:
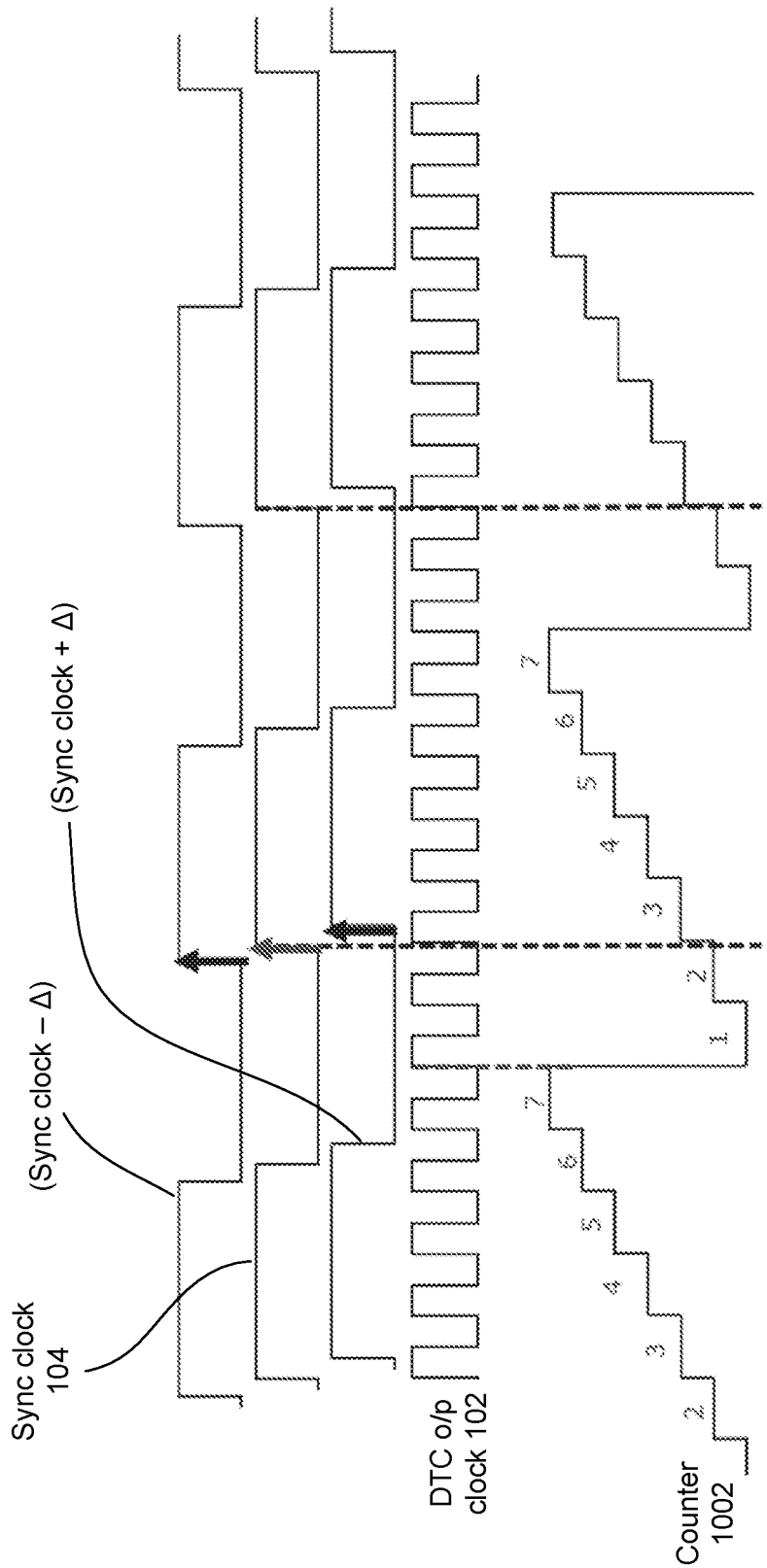
FIG. 12 illustrates timing diagram of an output of a counter, while the counter is initially not synchronized with a sync clock, according to some embodiments.
Figure 13:
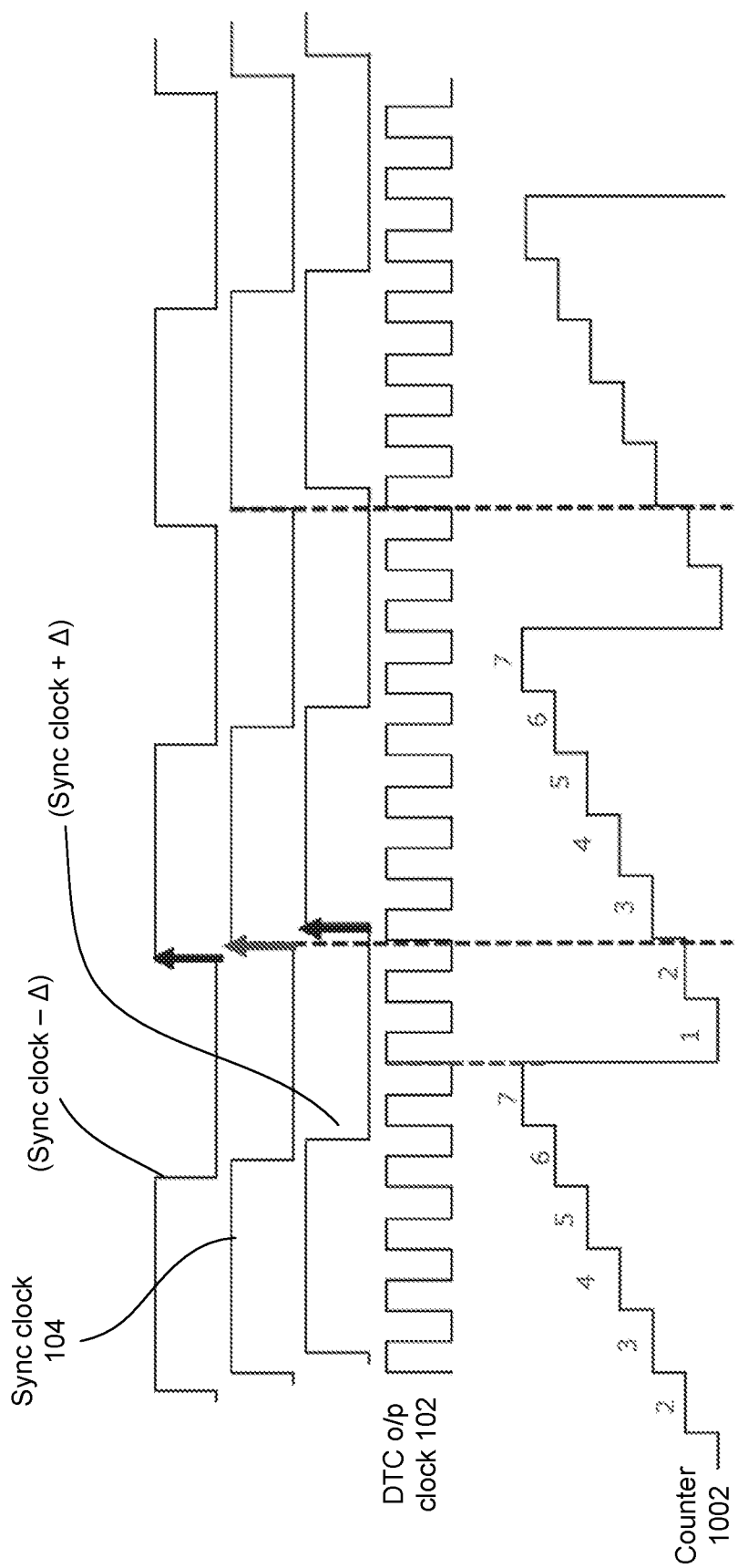
FIG. 13 illustrates timing diagram of an output of a counter, while the counter is synchronized with a sync clock, according to some embodiments.

FIG. 12 illustrates timing diagram of an output of the counter 1002, while the counter is initially not synchronized with the sync clock 104, according to some embodiments. FIG. 13 illustrates timing diagram of the output of the counter 1002, while the counter is synchronized with the sync clock 104, according to some embodiments. Referring to FIGS. 7A, 10A, 10B, 12, and 13, to synchronize the counter 1002 with the sync clock 104, initially the slow loop 705 of FIG. 7A may be locked. Such locking of the slow loop 705 may be performed, for example, at boot-up, and/or at any other appropriate time. Subsequently, the DTC 112 may generate the clock 104 with relatively low frequency, e.g., with a cycle time that may be larger than the longest expected delay of the clock network 724. Subsequently, the counter 1002 may be sampled with the sync clock 104. FIGS. 12 and 13 illustrate the sync clock 104, and two phase shifted versions of the sync clock 104. For example, the actual sync clock 104 may be aligned on time-zero, and the two phase-shifted sync clock 104 may be used for solving possible meta-stability issues (e.g., to cover possible skews).

The counter 1002 may be sampled with the sync clock 104, and also the two phase-shifted versions of the sync clock 104. Although two phase-shifted versions of the sync clock 104 is used, more or less than two phase-shifted versions of the sync clock 104 may also be used. In some embodiments, based on the sampling result, a phase of the counter 1002 may be adjusted to achieve synchronization. For example, in FIG. 12, the counter 1002 is not synchronized with the sync clock 104. The counter 1002 may be phase shifted (e.g., by two cycles in the example of FIGS. 12 and 13), such that the counter 1002 may be synchronized with the sync clock 104, as illustrated in FIG. 13.

In some embodiments, a point any which the frequency of the clock 102 output by the DTC changes may not be aligned with the rising edge of the sync clock 104. For example, in such embodiments, the frequency of the DTC output clock 102 may be changed at any time. However, it may be desired that synchronization between the DTC output and the sync clock 104 may still be maintained, even if the frequency change point is not aligned to the sync clock 104.

Figure 14:
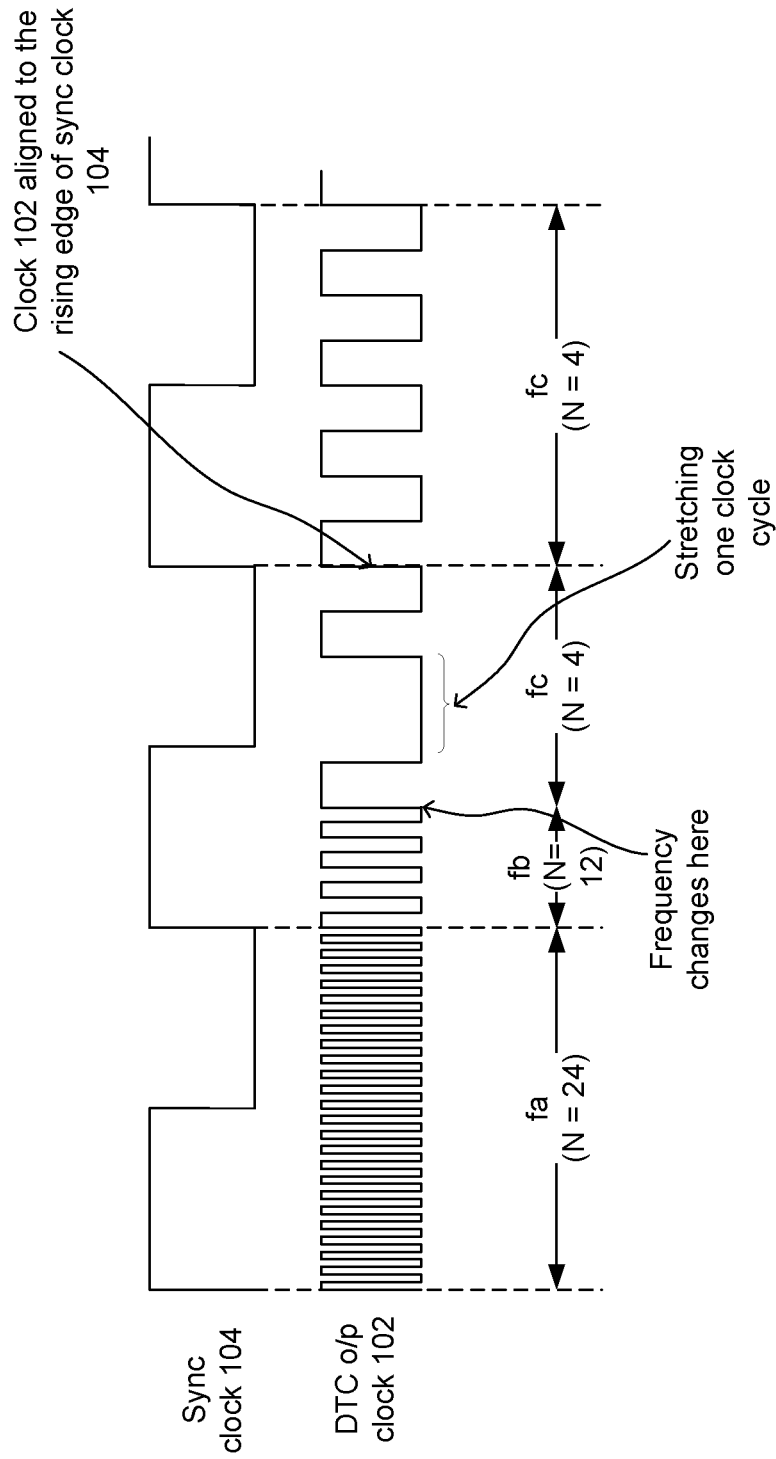
FIG. 14 illustrates a timing diagram of an output clock of a DTC, where a frequency change in the output clock is not aligned with rising edges of a sync clock and where a clock cycle of the DTC output clock is changed to maintain synchronism between the DTC output clock and the sync clock, according to some embodiments.

FIG. 14 illustrates a timing diagram of an output clock 102 of the DTC 112, where a frequency change in the output clock 102 is not aligned with rising edges of the sync clock 104, and where a clock cycle of the DTC output clock 102 is changed to maintain synchronism between the DTC output clock 102 and the sync clock 104, according to some embodiments. FIG. 14 illustrates three clock cycles of the sync clock 104. During the first clock cycle, assume that the clock 102 has a frequency of fa (e.g., which may correspond to 24 cycles of clock 102 within a single clock cycle of sync clock 104). During the third clock cycle, assume that the clock 102 has a frequency of fc (e.g., which may correspond to 4 cycles of clock 102 within a single clock cycle of sync clock 104). At the start of the second clock cycle of the sync clock 104, assume that the clock 102 frequency is changed to fb (e.g., which may correspond to 12 cycles of clock 102 within a single clock cycle of sync clock 104), and such a change may be aligned to the rising edge of the sync clock 104.

However, sometime after the second rising edge of the sync clock 104 and within the second clock period of the sync clock 104, the frequency of the clock 102 may change from fb to fc. In an example, without any additional measures, because of the change in the frequency form fb to fc, a rising edge of the clock 102 may not be aligned to the rising edge of the third clock cycle of the sync clock 104.

In some embodiments, to ensure that a rising edge of the clock 102 is aligned to the rising edge of the third clock cycle of the sync clock 104, a clock cycle of the clock 102 within the second clock cycle of the sync clock 104 may be changed, e.g., stretched or made longer, as illustrated in FIG. 14. Thus, the phase or clock period of a clock cycle in FIG. 14 is stretched to compensate for any potential phase, e.g., to achieve synchronization.

Equation 10 below may be used to calculate the phase compensation for realignment of the clock 102 and sync clock 104.

$$\text{Phase\_to\_correct} = \mod\left(\left(\text{sync\_clock\_period} - \int_1^{jump\_point} \text{old\_period}\right), \text{new\_period}\right). \quad \text{Equation 10}$$

The phase_to_correct may represent the amount of stretching in a single clock cycle (or divided among multiple clock cycles) of the clock 102. The mod(x,y) operation is a modular operation of x and y. For example, if x is divided by y, the mod(x,y) would represent a reminder of the division operation. Merely as an example, mod(20,3) may be 2.

The sync_clock_period may be a period of the sync clock 104. The old_period may represent the period of the clock 102 prior to the jump or change in frequency. For example, in FIG. 14, the old_period may be the period of the clock 102 with the frequency fb. In some embodiments, the term $\int_1^{jump\_point}$ old_period may represent the summation of the clock periods of the clock 102 in the clock cycle of the sync clock 104 prior to the change in frequency. For example, in FIG. 14, this term may represent a summation of the clock periods of the clock cycles having the frequency fb. In some embodiments, the term (sync_clock_period-$\int_1^{jump_{point}}$ old_period) may represent a time between the point where the frequency changes and the next rising edge of the sync clock 104. The new_period may be a clock period of the changed or new frequency of the clock 102. For example, in FIG. 14, this term may represent a period of the clock 102 with the frequency fc.

In some embodiments, the DTC 112 may include circuitry or logic that may calculate the phase_to_correct in accordance with equation 10, and the DTC 112 may stretch one clock cycle of the clock 102 by the phase_to_correct value. In some embodiments, stretching the clock cycle of the clock 102 in accordance with equation 10 may, for example, ensure that the third rising edge of the sync clock 104 in FIG. 14 is aligned to a rising edge of the clock 102.

In a DTC (e.g., such as the DTC 112), a multi-modulus divider (MMD, discussed herein later in further details) may receive an input clock signal (e.g., clock signal F1 of FIG. 1) from a DCO (digitally controlled oscillator). The MMD may facilitate coarse phase jumps, which may be synchronized with the rising and falling edges of the DCO clock (e.g., the MMD may allow half DCO cycle jumps). The MMD may select the phases for interpolation, and a digitally controlled edge interpolator (DCEI) may interpolate between two sequent DCO edges (rising and falling, or falling and rising) that the MMD selects. A general structure of a DTC is discussed in U.S. patent application Ser. No. 14/868,834, published as U.S. Patent Publication No. 2017/0093556, also discussed in U.S. patent application Ser. No. 13/958,295, issued as U.S. Pat. No. 9,137,084, and also discussed in U.S. patent application Ser. No. 13/969,132, issued as U.S. Pat. No. 9,071,304. These three U.S. Patent Applications are incorporated in references herein in their entirety. These references discuss general structure of a DTC.

In a given DTC based clocking scheme, a frequency of the DCO clock may be determined by several constrains. For example, the DCO clock frequency (e.g., frequency F1 in FIG. 1) may have to be equal to or above the DTC output frequency (e.g., frequency F2). In another example, a DCO clock half cycle may be suitable for DCEI interpolation. Thus, for example, if a DTC is to generate a 5 GHz clock, the DTC has to receive an input clock having frequency at least as high as 5 GHz. Similarly, for example, if a DTC is to generate a 10 GHz clock, the DTC has to receive an input clock having frequency at least as high as 10 GHz.

For example, a PLL may have to generate frequency which is at least as high as the maximal possible frequency on a die. Assume, for example, that a PLL supplies input clock to multiple DTCs is a die. Also, assume that one DTC is to output a 10 GHz clock, and the remaining DTCs are to output a 5 GHz clock. Then the PLL may have to generate clock at 10 GHz.

In some embodiments, for a PLL to continuously generate a 10 GHz input frequency, an inductor-capacitor (LC) based PLL may be used. If, instead of a LC based PLL, a conventional PLL is used, a dedicated power rail with a relatively high voltage level may be required, and such resources may not be available in most dies. However, in a LC based PLL, on-die inductors may not be scalable with process shift. Furthermore, on-die inductors may suffer from magnetic coupling risks. Also, on-die inductors may pose routing limitations, and may complicate power delivery network adjacent to the inductors.

In some systems, for most of operational period, a DTC may generate a clock signal that may be below moderate frequency of, for example, 5 GHz frequency (e.g., the frequency may vary, but remain below 5 GHz). However, in some situations and for short time spans (e.g., in a turbo mode of operation), the DTC output frequency may go beyond 5 GHz. In a conventional system, a PLL may generate a high frequency clock (e.g., a 10 GHz clock), and such a clock may be distributed to the DTC.

However, distributing a high frequency clock (e.g., a 10 GHz clock) may have various disadvantages. For example, distributing a high frequency clock (e.g., a 10 GHz clock) across the die may consume relatively high power. For example, when the system may operate in a low power/low frequency mode and the DTC outputs a relatively low frequency signal, the high frequency clock (e.g., the 10 GHz clock) may still have to be generated and distributed to the DTCs, thereby consuming high power to generate and distribute the clock. In another example, relatively high metal resources and strong repeaters may be needed to distribute the high frequency signal, e.g., to allow the high frequency clock to reaches its destination of one or more DTCs.

Figure 15A:
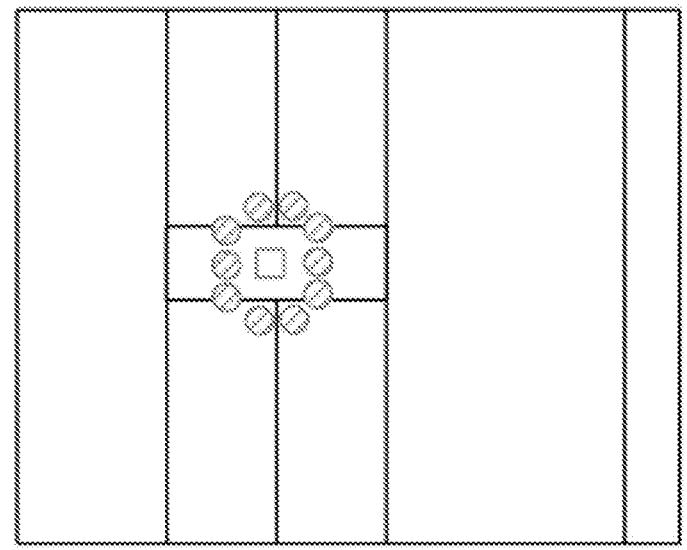
FIGS. 15A-15C illustrate various example placements of indictor-capacitor (LC) based PLL with respect to a plurality of DTCs, according to some embodiments.
Figure 15B:
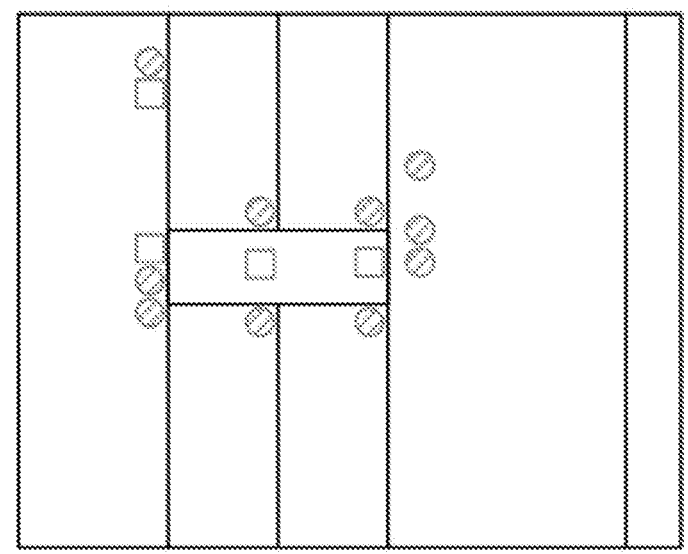
Figure 15C:
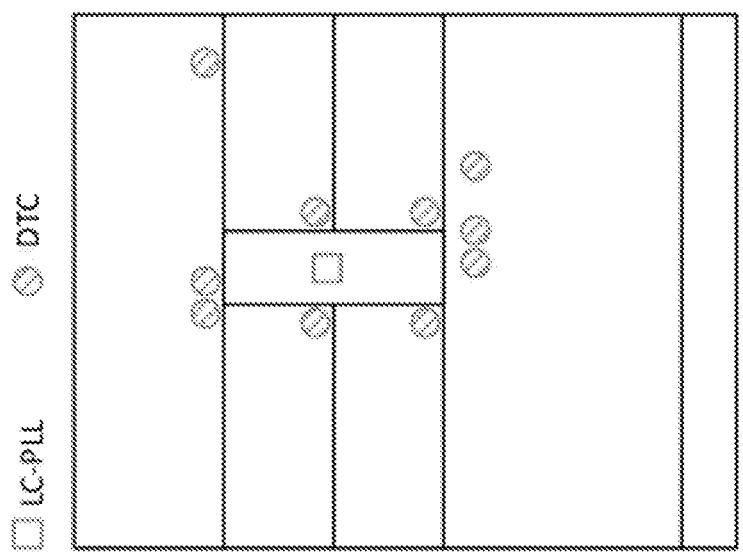

FIGS. 15A-15C illustrate various example placements of LC based PLL with respect to a plurality of DTCs, according to some embodiments. Each of these figures schematically illustrate a die. The shaded round shapes indicate positions of DTCs within the die, and the small square indicates position of LC based PLL (also referred to as LC-PLL) generating high frequency clock (e.g., 10 GHz clock). In FIG. 15A, a single LC-PLL supplies the high frequency clock to multiple DTCs, thereby resulting in lengthy routing of the high frequency clock. As discussed herein above, such lengthy routing of high frequency clock may consume relatively high power, and relatively high metal resources and strong repeaters may be needed to distribute the high frequency signal to all the DTCs.

In some embodiments, it may be possible to avoid lengthy distribution network of such high frequency clock by, for example, adding additional, dedicated, LC based PLLs, and place such LC based PLLs near a remote DTC (or near a group of remote DTCs), where the LC based PLLs may generate the high frequency clock. Such placement of LC-PLL is illustrated in FIG. 15B. This may overcome the long routing of the high frequency clock and may reduce the high power consumption associated with distribution of the high frequency clock. However, this approach may necessitate additional LC-PLLs, e.g., necessitate more on-die inductors, which may have various disadvantages discussed herein above.

In some embodiments, it may be possible to avoid lengthy distribution network of such high frequency clock by, for example, collecting at least some DTCs in a farm, e.g., near a single LC-PLL, and send the output clock of each DTC a long distance to the components using the DTC outputs (e.g., instead of sending the high frequency clock over a long distance). Such placement of LC-PLL and DTCs is illustrated in FIG. 15C. However, such an approach may still require one LC-PLL, and, in addition, may introduce strict floor plan limitation (e.g., which may not be feasible in some scenarios). For example, in a server system, there may be a number of cores (e.g., tens of cores). Collecting the DTCs of multiple cores in one farm, e.g., as illustrated in FIG. 15C, may not be feasible.

Thus, in some examples, the placements of LC-PLL and DTCs illustrated in FIGS. 15A-15C may make the overall architecture relatively less attractive for on-die deterministic domains.

In some embodiments, to overcome the issued discussed with respect to FIGS. 15A-15C, DTCs may operate in multiple modes (e.g., in one mode at a given time). Merely as an example, the DTCs may operate, at any given time, in either a normal mode of operation or an overclocking mode of operation.

For example, during a normal operation of a core (e.g., when a moderate frequency is to be output by the DTC), a DTC may operate in the normal mode of operation. Merely as an example, in the normal mode, the DTC may be expected to output clock with a frequency of 5 GHz of less. Thus, in the normal mode, an input clock to the DTC (e.g., which may correspond to the clock 101 of FIG. 1) may be of a moderate frequency (e.g., 5 GHz frequency). Such a moderate frequency may be generated by a regular All-Digital Phase Locked Loop (ADPLL) or another appropriate clock generation system, and the ADPLL may supply such a moderate frequency clock signal to the DTC (e.g., as an input clock to the DTC).

In some embodiments, in the overclocking mode of operation, the DTC may need to output a clock signal having a frequency that is more than the moderate frequency of 5 GHz. Merely as an example, the DTC may need to output a clock frequency of 6 GHz, 7 GHz, 10 GHz, or the like. Such an overclocking mode of operation may correspond to, for example, a turbo mode of operation of a processor, or a high frequency mode of operation. However, if the ADPLL still supplies the moderate frequency clock signal to the DTC, the DTC may not be able to output a clock signal having a frequency that is more than the moderate frequency. Accordingly, in some embodiments, during the overclocking mode of operation of the DTC, the ADPLL may supply a high frequency clock signal (e.g., a 10 GHz clock) to the DTC (e.g., as an input clock to the DTC). The high frequency clock signal may have a frequency that is higher than the desired output clock frequency of the DTC in the overclocking mode of operation.

Thus, the ADPLL may supply a moderate frequency clock to the DTC during the normal mode of operation, and may supply a high frequency clock to the DTC during the overclocking mode of operation. Usually, the overclocking mode of operation may not last long (e.g., may last for less than a millisecond, a few milliseconds, a few seconds, or the like). Thus, for most of the time the DTC and the ADPLL are operational, the ADPLL may supply the moderate frequency clock to the DTC, and may supply the high frequency clock only for a short duration. In some embodiments, because the high frequency clock is to be supplied to the DTC only for a short duration, a dedicated LC-PLL may not be needed to generate the high frequency clock—the ADPLL may generate such a high frequency clock for a short duration. For example, although a LC-PLL may be power efficient than an ADPLL in generating the high frequency clock, because the high frequency clock is generated only for a short duration, the ADPLL may be used.

FIGS. 16A-16B illustrate various example placements of ADPLL with respect to a plurality of DTCs, where one or more ADPLL may selectively generate a moderate frequency clock or a high frequency clock, according to some embodiments. Each of these figures schematically illustrate a die. The shaded round shapes indicate positions of DTCs within the die, and the non-shaded round shapes indicate position of ADPLL that selectively generates either a moderate frequency clock or a high frequency clock, e.g., based on an operating mode of the DTC. Although ADPLL is used as an example in FIGS. 16A-16B, any other appropriate digital clock generation system (e.g., a DCO) may be used instead.

For example, in FIG. 16A, a centrally located single ADPLL may selectively generate and transmit a moderate frequency clock (e.g., 5 GHz clock) or a high frequency clock (e.g., 10 GHz clock) to multiple DTCs. In FIG. 16B, an ADPLL may supply selectively generate and transmit a moderate frequency clock or a high frequency clock to a single neighboring DTC or a group of neighboring DTCs, and multiple such ADPLL may be included in the die. This is in contrast to FIGS. 15A-15C, where the LC-PLL generated a high frequency clock at all times when the DTC was operational. In some embodiments, using the ADPLL to selectively generate and transmit the moderate frequency clock or the high frequency clock to one or more DTCs may eliminate the problems discussed with respect to using LC-PLL, as discussed with respect to FIGS. 15A-15C.

In some embodiments, a conventional DTC may be configured to receive an input clock at a fixed frequency. However, as discussed with respect to FIGS. 16A-16B, the DTC may now receive a moderate frequency input clock during a normal mode, and a high frequency input clock during an overclocking mode of operation. Accordingly, an internal structure of the DTC may need to be modified to accommodate this variation in the input clock frequency.

Figure 17:
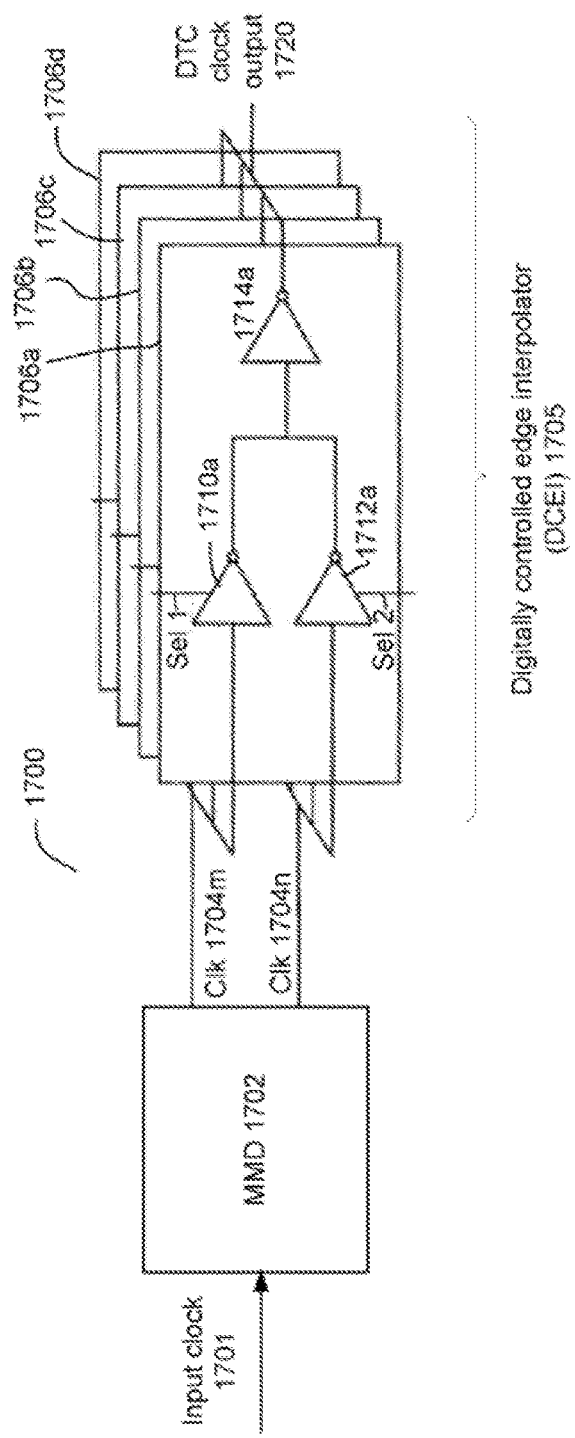
FIG. 17 illustrates an internal functional structure of a DTC.

FIG. 17 illustrates an internal functional structure of a DTC 1700. Although the DTC 1700 may have a much complex structure and may receive other inputs (e.g., a command word 112*b* and a delay control signal 112*d*, as discussed with respect to FIG. 1), only a simplified functional structure of the DTC 1700 is illustrated for sake of brevity.

The DTC 1700 comprises a multi-modulus divider (MMD) 1702 that may receive an input clock 1701. The input clock may be generated, for example, by a DCO (e.g., an ADPLL). In some embodiments, the MMD 1702 may be used for coarse phase jumps, which may be synchronized with the rising and falling edges of the input clock 1701 (e.g., the MMD may allow half DCO cycle jumps). In some embodiments, the MMD 1702 may divide the input clock 1701 (e.g., divide on the fly, based on a control word and/or a delay control signal), and generate two clock signals 1704*m* and 1704*n*. The clock 1704*n* may be a shifted replica of the clock 1704*m*. A frequency of the clocks 1704*m* and 1704*n* may be a desired output frequency of the DTC 1700.

In some embodiments, the DTC 1700 may comprise a digitally controlled edge interpolator (DCEI) 1705 that may receive the two clocks 1704*n* and 1704*m*. In some embodiments, the DCEI 1705 may comprises $2^N$ interpolators, where N is an integer equal to or greater than 2. In particular, N may be a number of bits that are used to control the interpolated fine delay/phase output from DCEI 1705. In the example of FIG. 17, N is 2, and hence, the DCEI may comprise four interpolators 1706*a*, . . . , 1706*d*.

In some embodiments, each of the interpolators 1706*a*, . . . , 1706*d* may have similar structure, and hence, the interpolator 1706*a* is discussed herein. In some embodiments, the interpolator 1706*a* may comprise a first inverter 1710*a* receiving the clock 1704*m*, and a second inverter 1712*a* receiving the clock 1704*n*. In some embodiments, the outputs of inverters 1710*a* and 1712*a* may be coupled together, and then coupled to an input of a buffer inverter 1714*a*. An output of the buffer inverter 1714*a* may drive an interpolated fine delay/phase output signal of the DCEI 1705.

In some embodiments, the other interpolators may also have a similar structure. For example, the interpolator 1706d may comprise inverters 1710d and 1712d, output of which may be coupled, and then supplied to a buffer inverter 1714d. Similarly, the interpolator 1706b and 1706c may have similar corresponding components. In some embodiments, the output of the buffer inverters 1714a, 1714b, 1714c, and 1714d may be coupled together, and may generate the DTC clock output 1720.

In some embodiments, the inverter 1710a may be controlled by a selection signal sel1. In some embodiments, the inverter 1712a may be controlled by a selection signal sel2. In some embodiments, the selection signals sel1 and sel2 may respectively determine whether the inverters 1710a and 1712a are responsive to the clock 1704m or 1704n.

In some embodiments, the interpolators 1706a, . . . , 1706d may be coupled in parallel to each other to clock signals 1704m and 1704n. In some embodiments, the interpolators 1706 may be configured as 2:1 multiplexers that selectively pass either clock 1704m or 1704n, e.g., depending on fine control bits (e.g., from the command word and/or the delay control signal, not illustrated in FIG. 17) applied to the DCEI 1705.

Figure 18:
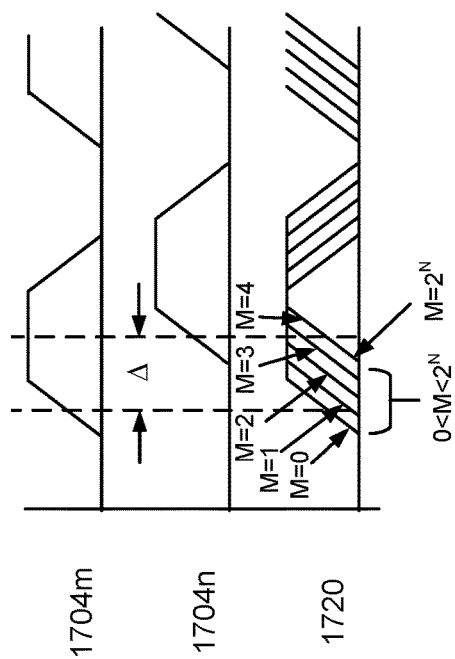
FIG. 18 depicts a timing diagram showing an interpolated fine-phase clock output from a DCEI, according to some embodiments.

FIG. 18 depicts a timing diagram showing the interpolated fine-phase clock output 1720 from the DCEI 1705, according to some embodiments. FIG. 18 illustrates the clocks 1704m and 1704n, which are merely phase shifted version of each other. M represents fine control bits input to the DCEI 1705 (not illustrated in FIG. 17). In the example of FIGS. 17 and 18, N is assumed to be 2, e.g., there are $2^N$ or four interpolators. M is an integer that may vary from 0 to 2N, e.g., vary from 0 to 4.

For N=2, DCEI 1705 comprises four interpolators 1706. Thus, there are four pairs of complementary signals Se1 and Se2 driving inverters 1710 and 1712 in the four interpolators 1706.

For the example of N=2, if M=0, no interpolation needs to be performed, and inverters 1710a, 1710b, 1710c, and 1710d (generally referred to as 1710) are powered, whereas inverters 1712a, 1712b, 1712c, and 1712d (generally referred to as 1712) are unpowered, e.g., by appropriately controlling the four pairs of complementary selection signals. All four powered inverters 1710 respond to the edge of clock 1704m, and the interpolated fine-phase clock output 1720 corresponds to M=0 in FIG. 18.

If M=1, three of the four inverters 1710 are powered and respond to the edge of clock 1704m, whereas one of the four inverters 1712 is powered and responds to the edge of clock 1704n. The interpolated fine-phase clock output 1720 corresponds to M=1 in FIG. 18.

If M=2, two of the four inverters 1710 are powered and respond to the edge of clock 1704m, whereas two of the four inverters 1712 are powered and respond to the edge of clock 1704n. The interpolated fine-phase clock output 1720 OUT to M=2 in FIG. 18.

If M=3, one of the four inverters 1710 is powered and responds to the edge of clock 1704m, whereas three of the four inverters 1712 are powered and respond to the edge of clock 1704n. The interpolated fine-phase clock output 1720 corresponds to M=3 in FIG. 18.

Lastly, if M=4, none of inverters 1710 are powered and none respond to the edge of clock 1704m, whereas all four inverters 1712 are powered and respond to the edge of clock 1704n. The interpolated fine-phase clock output 1720 corresponds to M=4 in FIG. 18.

The DTC 1700 and the timing diagram are not discussed in further details herein, as these are discussed in U.S. Patent Publication No. 2015/0036767, which is incorporated by reference in its entirety herein. Also, U.S. patent application Ser. No. 14/868,834, published as U.S. Patent Publication No. 2017/0093556, and U.S. patent application Ser. No. 13/969,132, issued as U.S. Pat. No. 9,071,304 discusses general structure of a DTC, and are is incorporated by reference in their entirety herein.

Referring again to FIGS. 16A-16B, in the normal mode, the ADPLL may generate and send clock at a moderate frequency to the DTCs; and in the overclocking mode, the ADPLL may generate and send a higher frequency clock to the DTCs. In some embodiments, it may be desired to add slope control features to the DCEI 1705, e.g., to enable the DCIE to allow interpolation of different widths of clock signals 1704m, 1704n (e.g., for the two different frequencies of the clocks 1704m, 1704n).

Merely as an example, assume that the moderate frequency generated by the ADPLL is 5 GHz, and the high frequency generated by the ADPLL is 10 GHz, although these frequencies are merely examples. Thus, the width of half clock cycle of the input clock 1701 at the moderate frequency is 100 picosecond (ps), and the width of half clock cycle at the high frequency is 50 picosecond (ps). In some embodiments, the DCEI 1705 may now have to support two interpolation spaces (e.g., 50 ps and 100 ps). Two such different interpolations spaces may require different sizing and tuning of the DCEI 1705. In some embodiments, in order to be able to tune for two different interpolation spaces, additional hardware may be added, e.g., to control a slope inside the interpolators, and consequently to control the output clock 1720 and the jitter.

Figure 19:
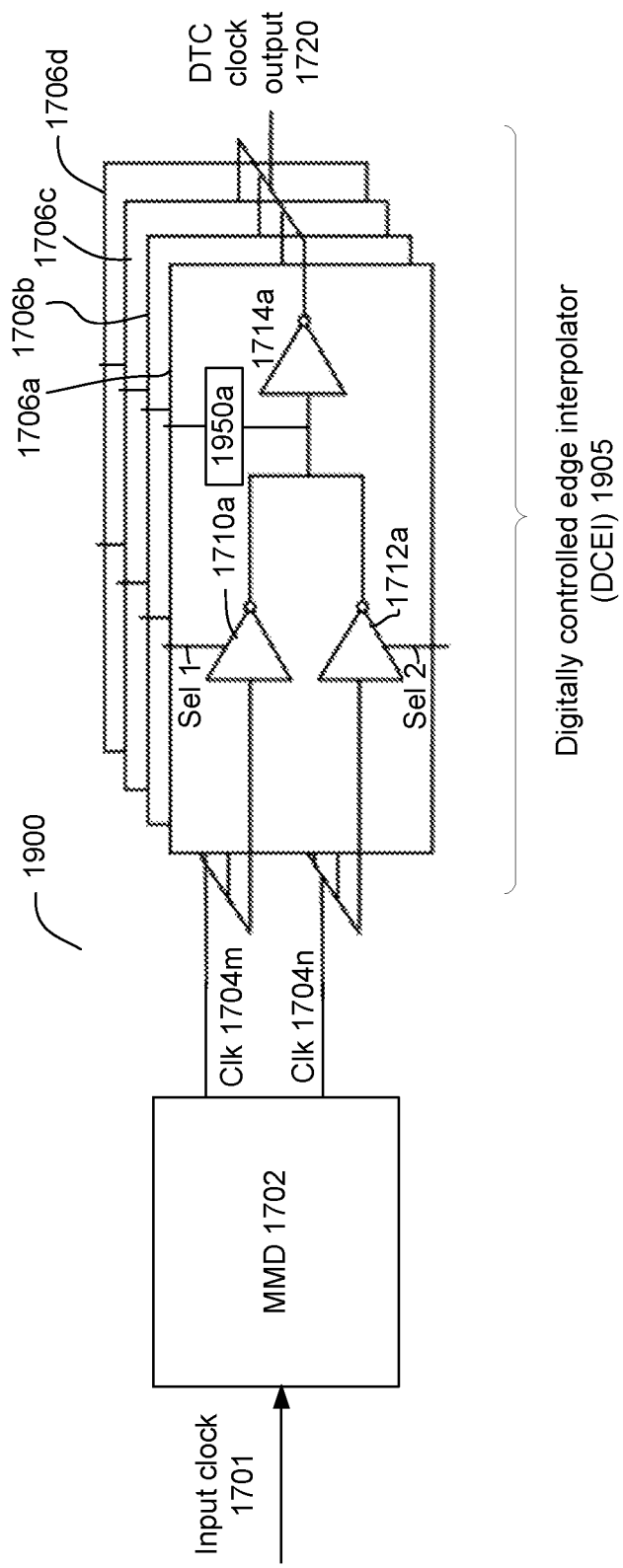
FIG. 19 illustrates an internal functional structure of a DTC that has been modified to accommodate two different input frequencies, according to some embodiments.

FIG. 19 illustrates an internal functional structure of a DTC 1900 that has been modified to accommodate two different input frequencies, according to some embodiments. The DTC 1900 is at least in part similar to the DTC 1700 of FIG. 17, and similar components in these two figures are labeled using similar labels. Also, to distinguish the DCEIs in FIGS. 17 and 19, the DCEI in FIG. 19 is labeled as DCEI 1905.

In some embodiments and as discussed herein in further details, the DTC 1900 may untie a limitation inside the DCEI 1905, e.g., that was present with a single central frequency in the DCEI 1705 of FIG. 17. In some embodiments, the DCEI 1905 may allow two (or more) interpolation frequencies, e.g., by controlling a slew rate at an internal contention node, e.g., inside each interpolator 1706.

Referring to FIG. 19, in some embodiments, a slope shaper 1950a may be added to the interpolator 1706a, and similar slope shapers 1950b, 1950c, and 1950d (not illustrated in FIG. 19) may also be added to the interpolators 1706b, 1706c, and 1706d, respectively. The slope shapers 1950a, . . . , 1950d may generally be referred to as slope shaper 1950. For example, the slope shaper 1950a may be coupled between the input to the buffer inverter 1714a and a ground (or power) terminal. In some embodiments, the slope shaper 1950a may control the corresponding interpolation node in the interpolator 1706a, e.g., to achieve large range of slopes. Although not illustrated in FIG. 19, in some embodiments, additional slope shaper may also be presented on one or both the clocks 1704m and 1704n, or on the input clock 1701.

In some embodiments, the slope shapers 1950 may be set to normal default values, e.g., for the normal mode of operation (e.g., when the input clock to the DTC 1900 has the moderate frequency, e.g., 5 GHz). In some embodiments, the slope shapers 1950 may be set to overclocking values, e.g., for the overclocking mode of operation (e.g., when the input clock to the DTC 1900 has the high frequency, e.g., 10 GHz).

In some embodiments, the normal default values and the overclocking values of the slope shapers 1950 may be based on pre-silicon simulations. In some embodiments, the normal default values and the overclocking values of the slope shapers 1950 may be calibrated post silicon, during fabrication, during system power-up, periodically, intermittently, and/or the like.

In some embodiments, calibration of the slope shapers may be performed based on silicon speed detector circuits. For example, for individual speed ranges, a certain shaping setting may be applied, based on pre-silicon simulation. In some embodiments, the interpolation node may be measured using, for example, phase monitors and/or time to digital converters (TDCs), and the slope shapers 1950 may be calibrated based on such measurements. For example, a slope shaper value of a specific frequency of the input clock 1701 (e.g., moderate or the high frequency), which may provide a reasonable low error in the interpolation node, may be selected for that frequency.

Figure 20:
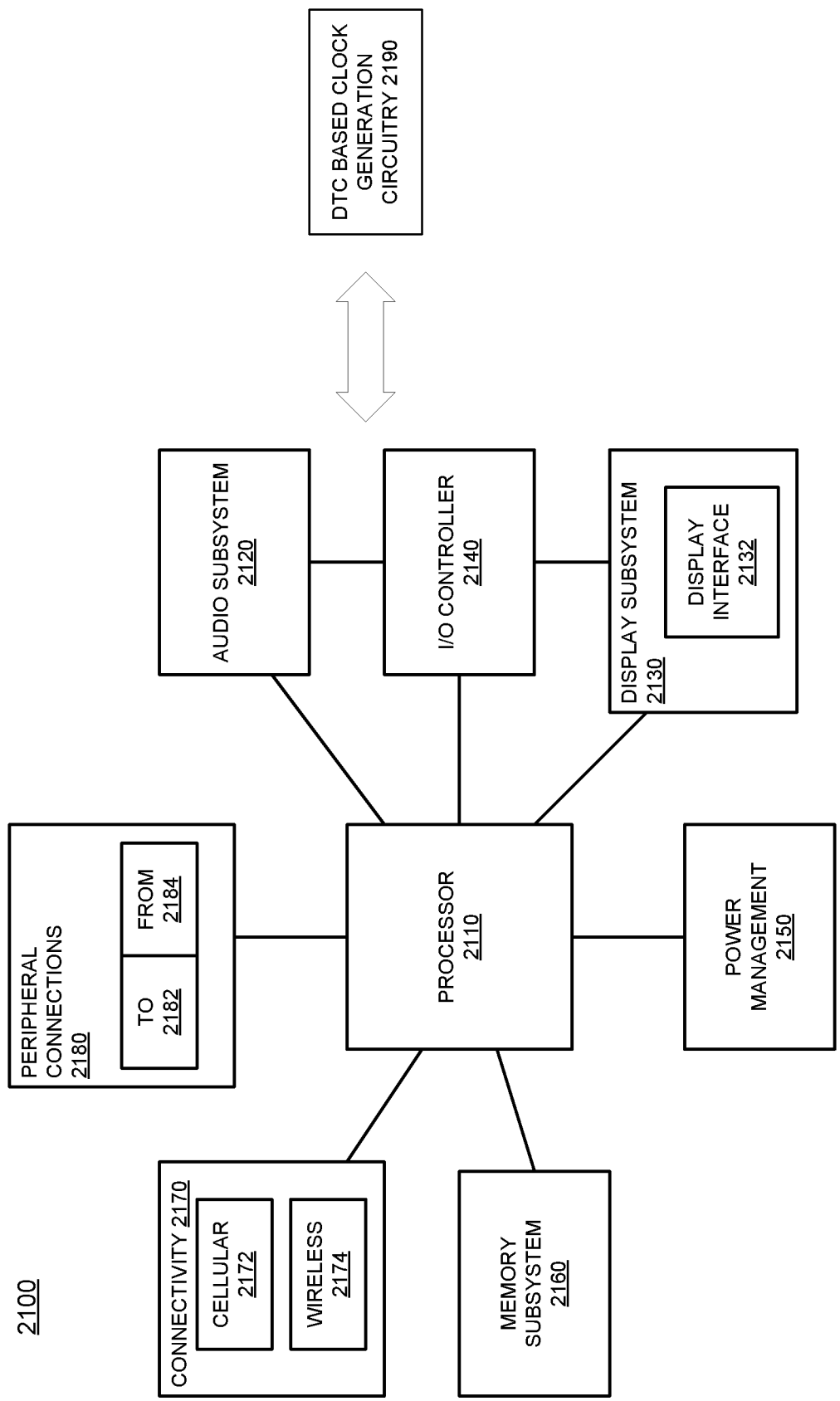
FIG. 20 illustrates a computer system, computing device or a SoC (System-on-Chip), where a DTC based clock generation circuitry may be used to generate one or more clock signals for various components of the computing device, in accordance with some embodiments.

FIG. 20 illustrates a computer system, computing device or a SoC (System-on-Chip) 2100, where a DTC based clock generation circuitry 2190 may be used to generate one or more clock signals for various components of the computing device 2100, in accordance with some embodiments. It is pointed out that those elements of FIG. 20 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise the DTC based clock generation circuitry 2190. The DTC based clock generation circuitry 2190 may generate one or more clock signals for one or more corresponding components of the computing device 2100, e.g., as discussed in this disclosure.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following example clauses pertain to further embodiments. Specifics in the example clauses may be used anywhere in one or more embodiments. All optional features of the apparatus described herein may also be implemented with respect to a method or process.

Clause 1. An apparatus comprising: a first circuitry to generate a first clock signal; and a second circuitry to generate a second clock signal such that: a frequency of the second clock signal is varied over a clock pulse of the first clock signal, and an average of the frequency of the second clock signal over the clock pulse of the first clock signal is substantially maintained at a target frequency.

Clause 2. The apparatus of clause 1, further comprising: a wireless interface to transmit and/or receive wireless signals at the target frequency, or a harmonic of the target frequency.

Clause 3. The apparatus of clause 1, wherein the second circuitry is to generate the second clock signal such that: a rising edge of the clock pulse of the first clock signal is substantially aligned to a rising edge of a clock pulse of the second clock signal.

Clause 4. The apparatus of any of clauses 1-3, wherein the second circuitry is to vary the frequency of the second clock signal over the clock pulse of the first clock signal such that: a first number of clock pulses of the second clock signal is generated at a first frequency; and a second number of clock pulses of the second clock signal is generated at a second frequency.

Clause 5. The apparatus of clause 4, wherein: the second clock signal is to have a third number of clock pulses over the clock pulse of the first clock signal, if the second clock signal was to be generated at the target frequency; and the average of the frequency of the second clock signal over the clock pulse of the first clock signal is maintained at the target frequency such that a sum of the first number and the second number is substantially equal to the third number.

Clause 6. The apparatus of clause 4, wherein: the target frequency is an integer multiple of a frequency of the first clock signal; the first frequency is not an integer multiple of the frequency of the first clock signal; and the second frequency is not an integer multiple of the frequency of the first clock signal.

Clause 7. The apparatus of any of clauses 1-3, wherein the second circuitry is to: receive an input clock signal; receive a command word; and generate the second clock signal by altering a frequency of the input clock signal, based on the command word.

Clause 8. The apparatus of clause 7, wherein the second circuitry is to: generate the second clock signal such that an input frequency of the input clock signal is an integer or non-integer multiple of an output frequency of the second clock signal.

Clause 9. The apparatus of clause 7, wherein the second circuitry is to: linearly or about linearly change a period of clock pulses of the second clock signal, based on a corresponding change in a value of the command word.

Clause 10. The apparatus of any of clauses 1-3, wherein the second circuitry is to: receive a delay control signal; and change a phase of the second clock signal, based on the delay control signal.

Clause 11. The apparatus of any of clauses 1-3, wherein the second circuitry is a digital-time-conversion (DTC) circuitry.

Clause 12. A non-transitory computer-readable storage media to store instructions that, when executed by a processor, cause the processor to: generate a clock signal; and dynamically vary a frequency of the clock signal such that an average of the frequency of the clock signal over a time period is substantially maintained at a target frequency.

Clause 13. The non-transitory computer-readable storage media of clause 12, wherein the instructions, when executed, cause the processor to: wirelessly communicate using wireless signals at the target frequency, or a harmonic of the target frequency.

Clause 14. The non-transitory computer-readable storage media of any of clauses 12-13, wherein the instructions, when executed, cause the processor to: receive a synchronization clock signal, wherein the time period corresponds to a period of a clock pulse of the synchronization clock signal.

Clause 15. The non-transitory computer-readable storage media of clause 14, wherein the instructions, when executed, cause the processor to: substantially align a rising edge of a clock pulse of the clock signal to a rising edge of a clock pulse of the synchronization clock signal.

Clause 16. The non-transitory computer-readable storage media of any of clauses 12-13, wherein the instructions, when executed, cause the processor to dynamically vary the frequency of the clock signal such that: a first number of clock pulses of the clock signal is generated at a first frequency; and a second number of clock pulses of the clock signal is generated at a second frequency.

Clause 17. The non-transitory computer-readable storage media of any of clauses 12-13, wherein the instructions, when executed, cause the processor to dynamically vary the frequency of the clock signal by: receiving a command word; and linearly varying a period of clock pulses of the clock signal, based on the command word.

Clause 18. A system comprising: a processor; a memory to store instructions, the memory coupled to the processor; and a digital-time-conversion (DTC) circuitry to: generate a clock signal, and vary a period of clock pulses of the clock signal such that a number of clock pulses generated over a time-period is substantially maintained at a target number.

Clause 19. The system of clause 18, further comprising: a clock generation circuitry to generate a synchronization clock signal, wherein the time period corresponds to a period of a clock pulse of the synchronization clock signal.

Clause 20. The system of any of clauses 18-20, wherein an average frequency of the clock signal over the time-period is substantially equal to a target frequency, and wherein the system further comprises: a wireless interface to transmit and/or receive wireless signals at the target frequency, or a harmonic of the target frequency.

Clause 21. A method comprising: generating a clock signal; and dynamically varying a frequency of the clock signal such that an average of the frequency of the clock signal over a time period is substantially maintained at a target frequency.

Clause 22. The method of clause 12, further comprising: wirelessly communicating using wireless signals at the target frequency, or a harmonic of the target frequency.

Clause 23. The method of any of clauses 21-22, further comprising: receiving a synchronization clock signal, wherein the time period corresponds to a period of a clock pulse of the synchronization clock signal.

Clause 24. The method of clause 23, further comprising: substantially aligning a rising edge of a clock pulse of the clock signal to a rising edge of a clock pulse of the synchronization clock signal.

Clause 25. The method of any of clauses 21-22, wherein the frequency of the clock signal is dynamically varied such that: a first number of clock pulses of the clock signal is generated at a first frequency; and a second number of clock pulses of the clock signal is generated at a second frequency.

Clause 26. The method of any of clauses 21-22, dynamically varying the frequency of the clock signal comprises: receiving a command word; and linearly varying a period of clock pulses of the clock signal, based on the command word.

Clause 27. One or more non-transitory computer-readable storage media to store instructions that, when executed by a processor, cause the processor to execute a method claimed in any of the clauses 21-26.

Clause 28. An apparatus comprising: means for performing the method claimed in any of the clauses 21-26.

Clause 29. An apparatus comprising: means for generating a clock signal; and means for dynamically varying a frequency of the clock signal such that an average of the frequency of the clock signal over a time period is substantially maintained at a target frequency.

Clause 30. The apparatus of clause 29, further comprising: means for wirelessly communicating using wireless signals at the target frequency, or a harmonic of the target frequency.

Clause 31. The apparatus of any of clauses 29-30, further comprising: means for receiving a synchronization clock signal, wherein the time period corresponds to a period of a clock pulse of the synchronization clock signal.

Clause 32. The apparatus of clause 31, further comprising: means for substantially aligning a rising edge of a clock pulse of the clock signal to a rising edge of a clock pulse of the synchronization clock signal.

Clause 33. The apparatus of any of clauses 29-30, wherein the frequency of the clock signal is dynamically varied such that: a first number of clock pulses of the clock signal is generated at a first frequency; and a second number of clock pulses of the clock signal is generated at a second frequency.

Clause 34. The apparatus of any of clauses 29-30, the means for dynamically varying the frequency of the clock signal comprises: means for receiving a command word; and means for linearly varying a period of clock pulses of the clock signal, based on the command word.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a first digital-to-time converter to receive a first clock, and to generate a second clock, wherein the first digital-to-time converter comprises a delay circuitry to vary a frequency of the second clock over a clock pulse of the first clock;
   a second digital-to-time converter to receive the first clock, and to generate a third clock, wherein the second digital-to-time converter comprises a delay circuitry to vary a frequency of the third clock over the clock pulse of the first clock;
   a first clock distribution network to receive the second clock and to distribute a version of the second clock to a first two or more components; and
   a second clock distribution network to receive the third clock and to distribute a version of the third clock to a second two or more components, wherein:
      the first digital-to-time converter is to substantially maintain at a target frequency an average of the frequency of the second clock over the clock pulse of the first clock;
      the first digital-to-time converter is to vary the frequency of the second clock over the clock pulse of the first clock such that:
         a first number of clock pulses of the second clock is generated at a first frequency; and
         a second number of clock pulses of the second clock is generated at a second frequency;
      the second clock is to have a third number of clock pulses over the clock pulse of the first clock, if the second clock was to be generated at the target frequency; and
      the average of the frequency of the second clock over the clock pulse of the first clock is maintained at the target frequency such that a sum of the first number and the second number is substantially equal to the third number.

2. The apparatus of claim 1, wherein the second digital-to-time converter is to substantially maintain at a second target frequency an average of the frequency of the third clock over the clock pulse of the first clock.

3. The apparatus of claim 1, further comprising:
   a divider to receive the version of the second clock and to divide a frequency of the version of the second clock; and
   a phase detector to receive an output of the divider and a synchronization clock.

4. The apparatus of claim 3, wherein an output of the phase detector is a signal bit that indicates whether a phase of the synchronization clock leads or lags a phase of the output of the divider.

5. The apparatus of claim 4, further comprising a filter coupled to the output of the phase detector.

6. The apparatus of claim 5, further comprising a multiplier coupled to the output of the phase detector and an output of the filter, wherein the multiplier is to multiply the output of the phase detector with the output of the filter.

7. The apparatus of claim 5, wherein the filter is a digital filter with adjustable coefficients.

8. The apparatus of claim 6, further comprising an integrator coupled to an output of the multiplier.

9. The apparatus of claim 8, wherein an output of the integrator is coupled to the first digital-to-time converter.

10. The apparatus of claim 8, wherein an output of the integrator is coupled to the delay circuitry of the first digital-to-time converter.

11. The apparatus of claim 1, further comprising a wireless interface to transmit and/or receive wireless signals at the target frequency, or a harmonic of the target frequency.

12. The apparatus of claim 1, wherein the first digital-to-time converter is to generate the second clock signal such that a rising edge of the clock pulse of the first clock is substantially aligned to a rising edge of a clock pulse of the second clock.

13. A system comprising:
   a memory;
   a processor coupled to the memory; and
   a wireless interface communicatively coupled to the processor, wherein the processor includes:
      a first digital-to-time converter to receive a first clock, and to generate a second clock, wherein the first digital-to-time converter comprises a delay circuitry to vary a frequency of the second clock over a clock pulse of the first clock;
      a second digital-to-time converter to receive the first clock, and to generate a third clock, wherein the second digital-to-time converter comprises a delay circuitry to vary a frequency of the third clock over the clock pulse of the first clock;
      a first clock distribution network to receive the second clock and to distribute a version of the second clock to a first two or more components; and
      a second clock distribution network to receive the third clock and to distribute a version of the third clock to a second two or more components, wherein the processor comprises:
         a divider to receive the version of the second clock and to divide a frequency of the version of the second clock;
         a phase detector to receive an output of the divider and a synchronization clock, wherein an output of the phase detector is a signal bit that indicates whether a phase of the synchronization clock leads or lags a phase of the output of the divider;
         a filter coupled to the output of the phase detector; and
         a multiplier coupled to the output of the phase detector and an output of the filter, wherein the multiplier is to multiply the output of the phase detector with the output of the filter.

14. An apparatus comprising:
- an inductor-capacitor based phase locked loop (LC-PLL) having an output to provide a first clock of a first frequency;
- a first digital-to-time converter to receive the first clock, and to generate a second clock, wherein the first digital-to-time converter comprises a delay circuitry to vary a second frequency of the second clock over a clock pulse of the first clock;
- a second digital-to-time converter to receive the first clock, and to generate a third clock, wherein the second digital-to-time converter comprises a delay circuitry to vary a third frequency of the third clock over the clock pulse of the first clock;
- a first clock distribution network to receive the second clock and to distribute a version of the second clock to a first two or more components;
- a second clock distribution network to receive the third clock and to distribute a version of the third clock to a second two or more components;
- a divider to receive the version of the second clock and to divide a frequency of the version of the second clock;
- a phase detector to receive an output of the divider and a synchronization clock, wherein an output of the phase detector is a signal bit that indicates whether a phase of the synchronization clock leads or lags a phase of the output of the divider;
- a filter coupled to the output of the phase detector; and
- a multiplier coupled to the output of the phase detector and an output of the filter, wherein the multiplier is to multiply the output of the phase detector with the output of the filter.

15. The apparatus of claim 14, wherein the first digital-to-time converter is to substantially maintain at a target frequency an average of the second frequency of the second clock over the clock pulse of the first clock.

16. The apparatus of claim 14, wherein the second digital-to-time converter is to substantially maintain at a second target frequency an average of the third frequency of the third clock over the clock pulse of the first clock.

17. An apparatus comprising:
- a first digital-to-time converter to receive a first clock, and to generate a second clock, wherein the first digital-to-time converter comprises a delay circuitry to vary a frequency of the second clock over a clock pulse of the first clock;
- a second digital-to-time converter to receive the first clock, and to generate a third clock, wherein the second digital-to-time converter comprises a delay circuitry to vary a frequency of the third clock over the clock pulse of the first clock;
- a first clock distribution network to receive the second clock and to distribute a version of the second clock to a first two or more components;
- a second clock distribution network to receive the third clock and to distribute a version of the third clock to a second two or more components;
- a divider to receive the version of the second clock and to divide a frequency of the version of the second clock; and
- a phase detector to receive an output of the divider and a synchronization clock, wherein an output of the phase detector is a signal bit that indicates whether a phase of the synchronization clock leads or lags a phase of the output of the divider.

* * * * *